US007066368B1

(12) United States Patent
Ruckmann et al.

(10) Patent No.: US 7,066,368 B1
(45) Date of Patent: Jun. 27, 2006

(54) PAPER WEB DRAW-IN DEVICE FOR A WEB-FED PRINTING PRESS

(75) Inventors: Wolfgang Günter Ruckmann, Würzburg (DE); Horst Bernhard Michalik, Höchberg (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 0 days.

(21) Appl. No.: 09/926,175

(22) PCT Filed: Mar. 18, 2000

(86) PCT No.: PCT/DE00/00849

§ 371 (c)(1),
(2), (4) Date: Jan. 7, 2002

(87) PCT Pub. No.: WO00/56646

PCT Pub. Date: Sep. 28, 2000

(30) Foreign Application Priority Data

Mar. 19, 1999 (DE) ................................ 199 12 290
Oct. 22, 1999 (DE) ................................ 199 50 942

(51) Int. Cl.
*G03B 1/30* (2006.01)

(52) U.S. Cl. ............................ 226/74; 226/75; 226/87; 226/91; 226/173; 270/32; 270/41

(58) Field of Classification Search .................. 226/74, 226/75, 86, 87, 91, 92, 173; 242/615.21; 270/32, 41, 52.07, 52.08
See application file for complete search history.

(56) References Cited

U.S. PATENT DOCUMENTS

| | | | | | |
|---|---|---|---|---|---|
| 1,107,372 | A | * | 8/1914 | Smith | 226/74 |
| 2,080,524 | A | * | 5/1937 | Allen | 226/74 |
| 2,149,366 | A | * | 3/1939 | Seaman et al. | 270/41 |
| 3,125,335 | A | | 3/1964 | Becker | |
| 3,367,549 | A | * | 2/1968 | Assony | 226/74 |
| 3,929,267 | A | * | 12/1975 | Foster | 226/74 |
| 4,154,386 | A | * | 5/1979 | Kawada | 226/91 |
| 4,187,968 | A | * | 2/1980 | Winterholler et al. | 226/92 |
| 4,619,449 | A | * | 10/1986 | Fischer | 270/5.01 |
| 5,169,082 | A | | 12/1992 | daSilva et al. | |
| 5,201,269 | A | | 4/1993 | Eckert | |
| 5,581,908 | A | * | 12/1996 | Theilacker | 226/92 |
| 5,605,267 | A | * | 2/1997 | Whitten | 226/91 |
| 5,827,166 | A | | 10/1998 | Cestonaro | |
| 6,497,643 | B1 | | 12/2002 | Hartmann et al. | |
| 6,510,790 | B1 | | 1/2003 | Brückl et al. | |

FOREIGN PATENT DOCUMENTS

| | | | |
|---|---|---|---|
| CH | 342241 | A | 11/1959 |
| DE | 1189562 | B1 | 3/1965 |
| DE | 1273483 | B1 | 7/1968 |
| DE | 1931337 | A1 | 1/1970 |
| DE | 2241127 | A1 | 3/1974 |
| DE | 2754179 | A1 | 8/1979 |
| DE | 3117419 | A1 | 4/1982 |
| DE | 3347715 | A1 | 7/1985 |

(Continued)

*Primary Examiner*—John Q. Nguyen
(74) *Attorney, Agent, or Firm*—Jones, Tullar & Cooper, PC

(57) ABSTRACT

At least one paper web is drawn into a web-fed rotary printing press. A draw-in device is provided with permanently fixed pointed bars or spikes. These can be moved or oriented so that they penetrate the paper web only during drawing in of the web into the printing press.

6 Claims, 23 Drawing Sheets

FOREIGN PATENT DOCUMENTS

| | | | |
|---|---|---|---|
| DE | 3403350 | A1 | 8/1985 |
| DE | 4219285 | A1 * | 1/1993 |
| DE | 19523812 | A1 | 1/1997 |
| DE | 19612924 | A1 | 2/1997 |
| EP | 415077 | A1 | 7/1991 |
| EP | 477769 | A2 | 4/1992 |
| EP | 533042 | A1 | 3/1993 |
| EP | 477769 | B1 | 7/1995 |
| EP | 781723 | A2 | 7/1997 |
| JP | 57-191742 | | 12/1982 |
| JP | 2-282155 | | 11/1990 |
| WO | WO 98/43904 | | 10/1998 |
| WO | WO 99/47446 | | 9/1999 |
| WO | WO 00/10808 | | 3/2000 |

* cited by examiner

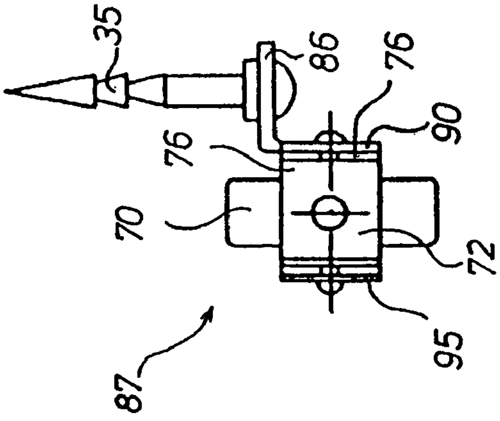
Fig.10
Fig.8
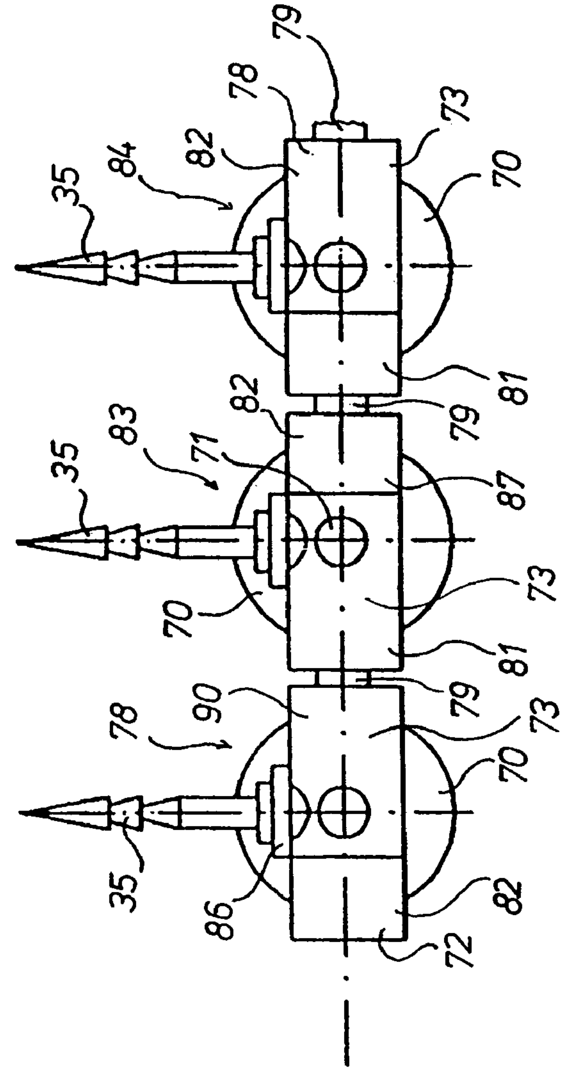
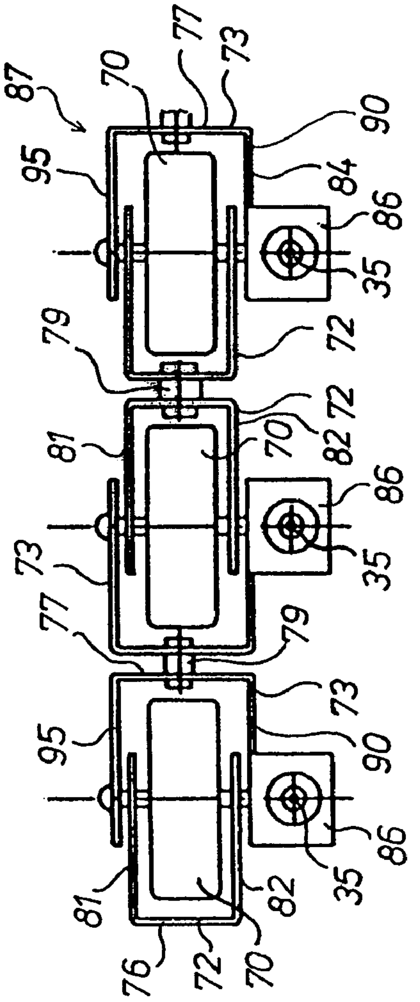
Fig.9

PAPER WEB DRAW-IN DEVICE FOR A WEB-FED PRINTING PRESS

FIELD OF THE INVENTION

The present invention relates to a device for drawing in paper webs. The paper webs are drawn along a web transport path into a web-fed rotary printing press.

DESCRIPTION OF THE PRIOR ART

A gluing device, for example a transverse gluing device, has become known from EP 0 477 769 B1.

A device has become known from U.S. Pat. No. 5,169,082, by which a plurality of U-shaped cuts are made in two paper webs resting on top of each other in such a way that the two paper webs are hooked together.

DE-AS 12 73 483 discloses a method and a device for stapling together tongues of several writing and carbon printing paper webs placed on top of each other.

Devices for stitching by means of thread have become known from DE 195 23 812 A1 and DE 19 31 337 C, for example.

To positively lock several paper webs by an electrostatic charge has become known, for example, from DE 31 17 419 A1 and WO 98/43904.

U.S. Pat. No. 5,827,166 discloses an arrangement for connecting two cigarette paper webs (so-called "cold welding") by a beading arrangement.

A device for drawing in webs of material in web-fed rotary printing presses has become known from DE 22 41 127 C. A finite traction means, for example in the form of a traction chain, is used. The traction chain has a lateral hooking device for the start of a paper web. The length of the traction chain has been selected to be such that it approximately corresponds to a distance over which a paper web maximally runs in a print unit. Several electro-mechanical drive mechanisms, which are synchronized with each other, act simultaneously on the traction chain in order to move it along a guide device. Switchable shunts permit changes in the direction of the traction chain. Storage tubes are employed for keeping the traction chain safe.

A stapling device for stapling several paper webs outside of a folding apparatus has become known from DE 11 89 562.

EP 0 533 042 A1 shows a roller for guiding paper webs, having an annular groove as a traction means.

The later published WO 00/10808 discloses a reinforcement element for a draw-in tip of a paper web with spikes penetrating the paper web.

CH-PS 342 241 describes a permanently acting conveying device for finite sheets of paper.

A device for the automatic feeding of a start of a paper web is known from DE 196 12 924 A1. The paper web is guided by endless driven conveyor belts over turning bars or a folding hopper.

WO 99/47446 and EP 0 415 077 A1 disclose devices for longitudinal folding having paper deflection means.

SUMMARY OF THE INVENTION

The object of the present invention is based on providing a device for drawing in paper webs.

The object is attained in accordance with the invention by drawing at least one paper web along a transport path for the paper web into a web-fed rotary printing press. This web draw-in is accomplished using a draw-in device that carries permanently attached spikes. These spikes can be moved so that they penetrate the paper web only during the drawing in of a start of a paper web into the web-fed rotary printing press.

The advantages which can be realized by the present invention reside, in particular, in that the paper web traction can take place, for example over the folding hopper and past it, through the gap between the hopper folding rollers as far as a downstream connected unit, such as draw-in rollers, transverse folding apparatus, etc. Draw-in times can be considerably reduced. In connection with the employment for draw-in via a longitudinal folding hopper, it is possible to avoid the manual draw-in, which contains the danger of accidents, of the paper webs, or of a train, into the hopper folding rollers which, for example, have already been brought into rotation by hand.

Furthermore, no special draw-in tip is necessary.

BRIEF DESCRIPTION OF THE DRAWINGS

Preferred embodiments of the present inventions are represented in the drawings and will be described in greater detail in what follows.

Shown are in.

DESCRIPTION OF THE PREFERRED EMBODIMENTS

Figure 1:
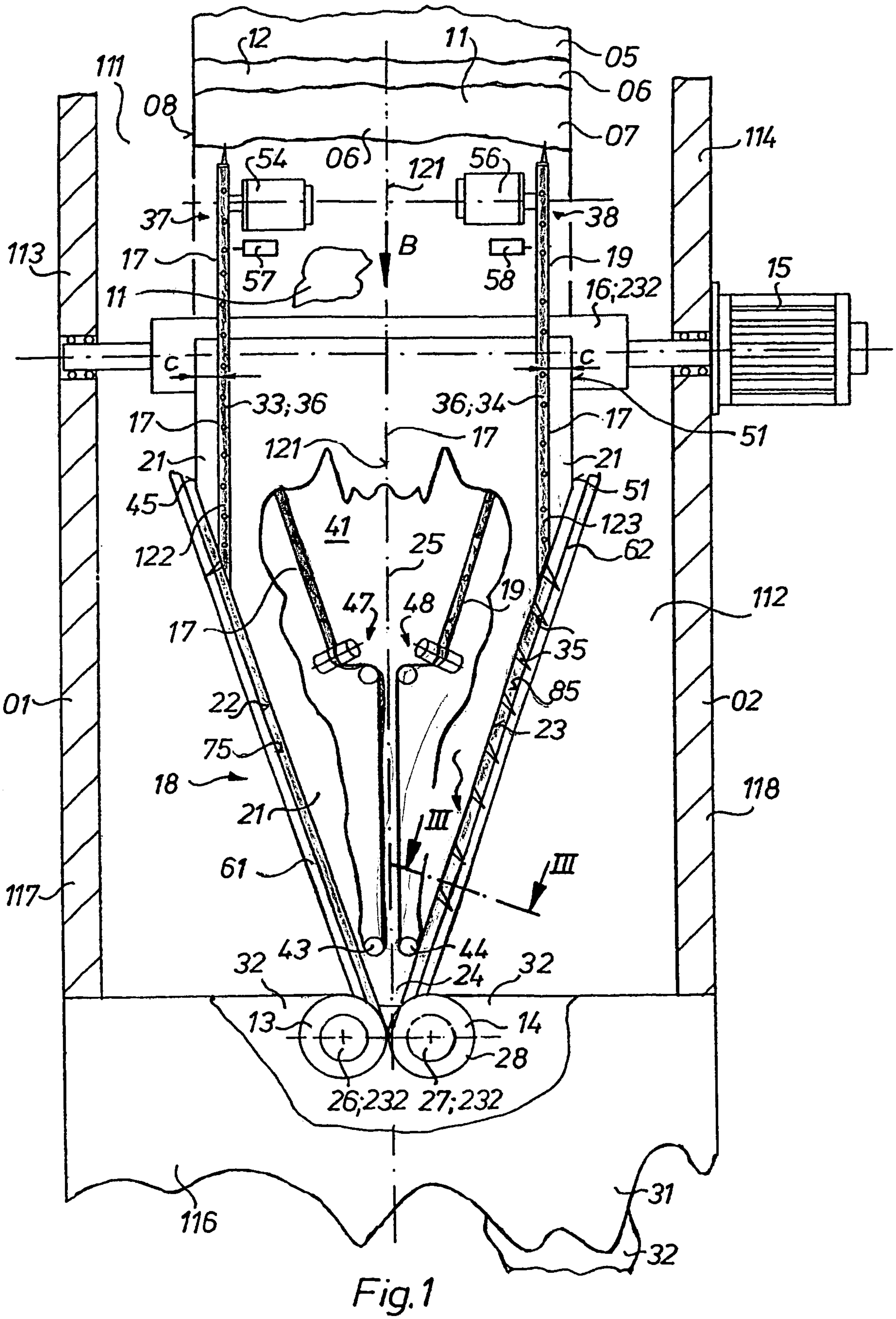
FIG. 1, a front view of a folding hopper with driven, belt-shaped or toothed belt-shaped traction means, which are moved along a hopper insertion plate, deflected at the hopper flanks and are finally moved along the hopper flank plates before they are conducted into the inside of the longitudinal folding hopper in front of the hopper folding rollers, FIG. 2, a lateral view in accordance with FIG. 1, but without lateral frames, with a schematic representation of the drive mechanism of an endless or finite traction means with spikes acting together with a pushing device for pushing the paper webs, or a locked-together train, on the spikes, FIG. 3, a cross section taken along line III—III through a guide device of a belt-shaped traction means in the shape of a belt or toothed belt in accordance with FIG. 1, the section rotated by 90, FIG. 4, a longitudinal section taken along line IV—IV through the guide device in the shape of a belt or toothed belt in accordance with FIG. 3, FIG. 5, a lateral view of a belt-shaped, or toothed belt-shaped traction means in the shape of a belt or toothed belt with a plurality of spikes, FIG. 6, a view from above on the traction means in FIG. 5, FIG. 7, an example of a pressure roller of a pushing device in section, FIG. 8, a lateral view of a finite or endless traction means in the form of a roller chain with spikes, FIG. 9, a view from above on the traction means in accordance with FIG. 8, FIG. 10, a front view of the traction means in accordance with FIG. 8, FIG. 11, a representation of a guide device (in section) fastened on an underside of an insertion plate, with a roller chain member with a spike fastened thereon, and a support block for supporting the spike while paper webs, or a train, are threaded on, FIG. 12, a perspective representation of several traction means members, each having a spike, in a guide device.

One or several paper webs 05, 06, 07, 12, or a train 08, 140, already formed from one or several paper webs, run into a so-called path or train pre-entry device 111. It ends shortly in front of a hopper insertion roller 16 and is of sufficient length for being able to dependably take over arriving, pulled or pushed paper webs 05, 06, 07, 12, or a train 08, 140, from the respective draw-in devices.

The paper webs 05, 06, 07, 12, or the train 08, 140, are drawn-in by means of paper web draw-in devices, known per se, as far as the path or train pre-entry device 111, and are subsequently conveyed on. In the final phase of this draw-in process, the paper webs, or the train, are separated from the paper web front fastenings, which respectively hold them. Such a separating device, not represented, consists for example of a rotating top and bottom cutter, between which the paper webs/train are drawn. After cutting off the paper web fronts, or train fronts, the finite draw-in chains are conducted into a storage device in guide rails fixed to the frame.

The path or train pre-entry device 111 (FIG. 1) essentially consists of a left lateral frame 113 and a right lateral frame 114, between which a slide plate 11, for example oriented horizontally, or inclined at an angle (for example 30) in respect to the horizontal in the direction of the paper web running direction, and fixed on the lateral frames, is arranged. This slide plate 11 can have a closed sliding face (upper face), but can also be designed in open work, for example grid-shaped. Its purpose is to prevent the arriving paper webs 05, 06, 07, 12, or the train 08, from falling through downward, or to support the respectively single webs conveyed by one or several draw-in system(s) long enough until they are grasped by a driven combining cylinder or roller 03, seated in the lateral frames 113, 114, and by a pressure cylinder 04, or pressure roller 04, which is in contact with it and is also seated in the lateral frames 113, 114. At least the combining cylinder/roller 03 is driven by an electric motor at a circumferential speed which is equal to, or slightly greater than the paper web draw-in speed set by the press. The combining cylinder/roller 03 and the pressure cylinder 04, or pressure roller 04, roll off on each other in a slit, or slits, in the slide plate 11. In this case, the combining roller 03 can project slightly past a slide surface 126, shown in FIG. 23 of the slide plate 11. However, the paper web draw-in process can also terminate, viewed in the direction of the paper web running, downstream of the combining roller 03.

In the preferred embodiments described (for example in accordance with FIG. 1), a center running path 121 (if possible) and/or—if required—a left outer running path 122 and a right outer running path 123, for a traction means 33, 34, or 124 which may be either finite or endless, start in the area of the path or train pre-entry device 111.

Figure 23:
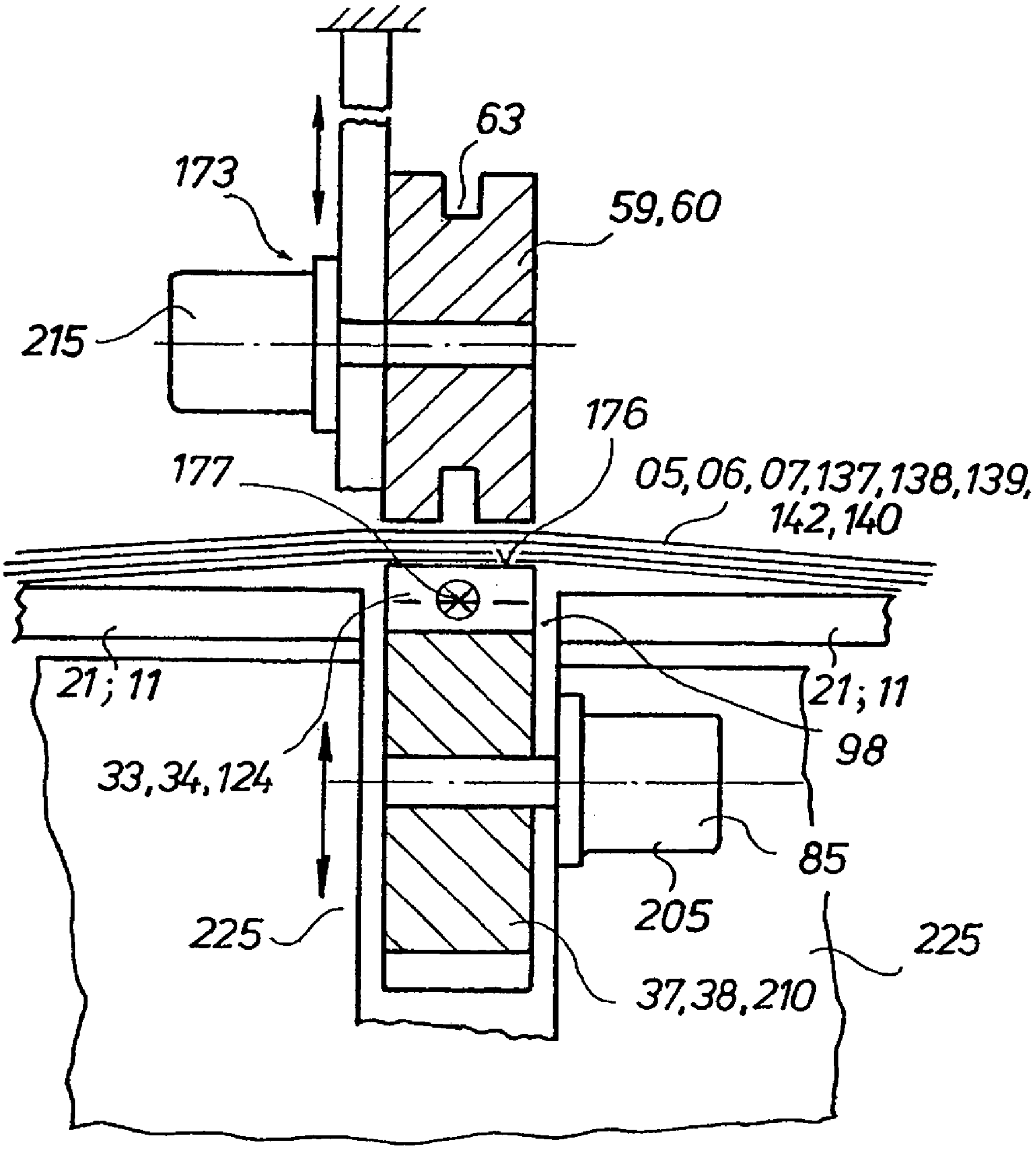

In the area of the slide plate 11, at least one deflection, or traction, wheel 37, 38 is provided for each traction means 33, 34, 124. The rotating shafts of these deflection, or traction, wheels 37, 38 are located underneath the slide plate 11 and they project through slits 98, 99 in the slide plate 11, or their periphery is located below the upper slide surface 126, or underneath the slide plate 11, all as seen in FIG. 23. The deflection, or traction, wheels 37, 38 can be designed as pure guide wheels, but also as drive wheels for the traction means 33, 34, 124. If they are used as traction wheels 37, 38, they are driven by gears or electro-mechanical, position-controlled individual drive mechanisms in such a way that the traction means 33, 34, 124 to be respectively driven by them move synchronously with the preset paper web draw-in speed. The traction means 33, 34, 124 are respectively deflected, or conveyed, or moved by each of deflection, or traction, wheels 37, 38 in such a way that a movement of the traction means 33, 34, 124 along the slide plate 11 takes place in the provided paper web running direction in the direction toward the hopper projection 24.

Figures 2, 7:
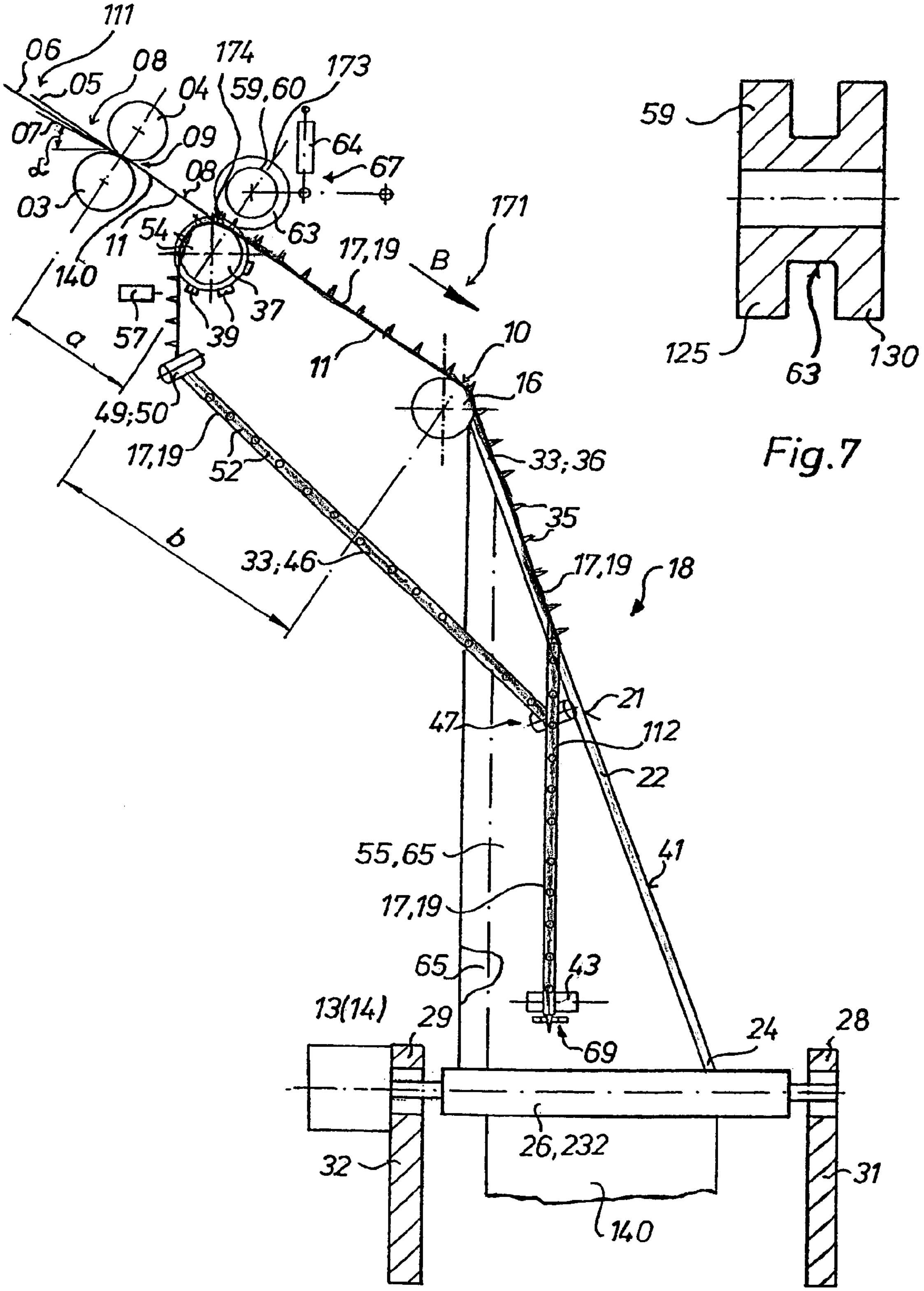
Figure 3:
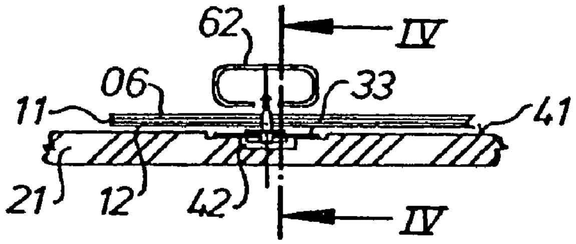
Figure 4:
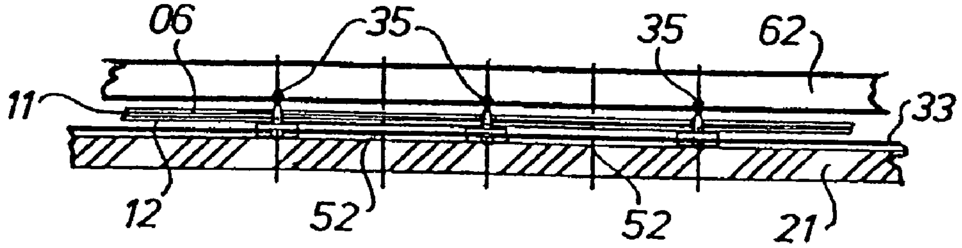
Figure 5:
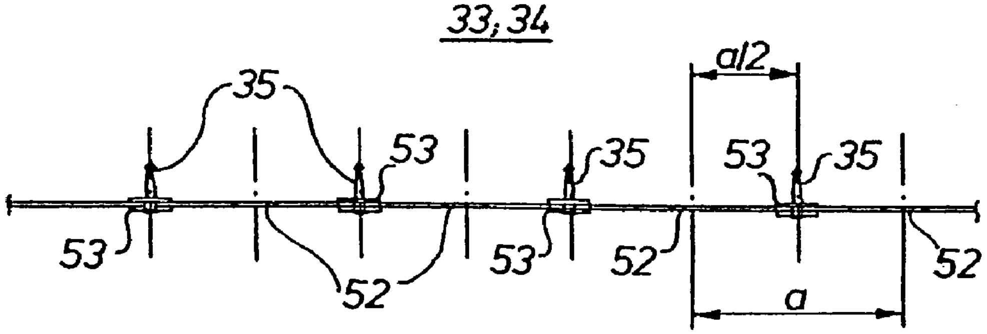
Figure 6:
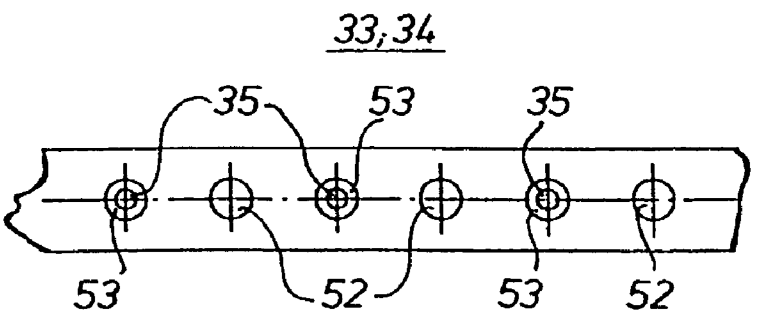

The traction means 33, 34, 124, whether they are endless or of finite length, have spikes 35, which are directly fastened on them, are needle-like and are oriented toward the paper webs, or the train as seen in FIGS. 3, 4, 5, 6, 8, 9, 10, 11, 12. Deflection or traction wheels 37, 38, and pressure roller(s) 59, 60 work together with them. The pressure rollers 59, 60 can each have their own electric motor 215, as seen in FIG. 23, whose number of revolutions and/or angle of rotation can be controlled. They can be moved against and away from the surface of the deflection, or traction wheel 37, 38, which works together with them, by a pneumatic work cylinder 64, fixed on the frame, as shown in FIG. 2. These pressure rollers 59, 60 are each provided with a recess 63 extending over their entire circumference, so that they have a pressure disk 125, 130 respectively left and right of the recess 63, as seen in FIG. 7. The purpose of this respective recess 63 is to assure a passage, free of damage, of the spikes 35 through the area of the respective pressure roller 59 assigned to them. Pressure disks 125, 130, respectively provided to the left and right of the recess 63 push the paper webs 05, 06, 07, 12, or the train 08, 140, during their passage on the spikes 35, so that they are dependably threaded. This means that the paper webs 05, 06, 07, 12, or more, or the train 08, are positively locked with the traction means 33, 34, 124 via the spikes 35. By provision of coarse surfaces of the pressure disks 125, 130, it is additionally possible for a force to act on the web(s), or the train 08, through frictional connection for moving the webs, or the train, forward in the direction toward the web, or train, conveying device 112.

The pressure rollers 59, 60 can be made of a hard material, for example ceramic, metal, or also a hard plastic material. However, they can also be made of a softer, rubber-elastic material, or have such a surface.

Viewed in the direction of running of the paper web, as seen in FIG. 1, the web, or train, conveying device 112 is connected downstream of the web, or train, pre-entry device 111. This web, or train, conveying device 112 has the job of conveying one or several paper webs 05, 06, 07, 12, or the train 08, 140, to a further processing device 116, for example a folding apparatus. In this case, it is possible to provide a longitudinal cutting device, or a longitudinal folding device 18, acting on the paper webs, or the train, for example, in the further processing device provided in the area of the web, or train, conveying device 112, but this is not absolutely necessary.

The web, or train, conveying device 112 essentially consists of a left lateral frame 117 and a right lateral frame 118, on which lateral frames 113, 114 the web, or train, pre-entry device 111 are directly or indirectly mounted. Driven insertion rollers 16—for example in the form of a hopper insertion roller 16—which are seated in the two lateral frames 113, 114 are provided in the preferred embodiment (FIG. 1, FIG. 2, FIG. 13, FIG. 22). The drive of these hopper insertion rollers 16 can be provided electro-mechanically by a drive motor 15, whose number of revolutions, or position, are controlled. However, it is also possible to effect driving by means of another mechanical drive mechanism from the folding apparatus 116, or from another component. The circumferential speeds of the hopper insertion roller 16 are synchronized with the preset paper web speed by an electronic control, or regulation, or are set in accordance with a preset relationship. Traction rollers, which are placed on the hopper insertion roller (insertion roller) 16, can act together with the latter.

A longitudinal folding hopper 18, which is fixed in the lateral frame and which can be displaced at least in the direction toward the lateral frames 117, 188, is provided as the web, or train, conveying device 112 in the preferred embodiment. The longitudinal folding hopper 18 has a hopper plate 21, which is bordered on both sides by hopper flanks 22, 23, which extend at an acute angle toward each other. A hopper projection 24, which terminates between driven hopper folding rollers 26, 27, adjoins the hopper flanks 22, 23.

The two hopper folding rollers 26, 27, which are, for example driven by electric motors, are respectively seated at a front and a rear hopper folding roller bracket 28, 29 which, in turn, are respectively arranged on a folding apparatus frame 31, 32, as seen in FIG. 2.

When traction means 33, 34, 124, which can be either of finite length or endless are employed, one or several traction means drive mechanisms 85 are provided along the movement, or running path 17, 19, 121, 122, 123. They respectively consist of an electric motor 205, whose number of revolutions or position are controlled, and which has a drive wheel 37, 38, such as a pinion gear, chain wheel, etc. (FIG. 23), matched to the traction means 33, 34, 124. However, it is also possible to employ so-called rotary current-fed synchronous and/or asynchronous linear motors. These linear motors can be provided with superimposed d.c current braking. The primary element with the coils is arranged fixed on the frame, while the secondary element, i.e. the element which moves, represents the traction means 33, 34, 124. In this case, it is made of a ferromagnetic material, or of a large proportion of this material.

However, the drive of the traction means 33, 34, 124 can also take place, for example, via gears from a synchronous shaft of the paper guidance, or from the downstream connected folding apparatus 116.

One or several traction means drive mechanisms of the type just described can be provided along the movement, or running path 17, 19, 121, 122, 123. Otherwise, the respective traction means 33, 34, 124 are guided by means of guide rollers 43, 44, 47, 48, 49, 50, which are fixed on the frame, The profiles of the guide rollers 44, 47 to 50 have been respectively matched to the side—for example the underside of the traction means 33, 34—, on which they act. They can be designed, for example, as spike wheels, gear wheels, chain wheels, toothed belt pulleys or roller with a guide groove, etc.

The movement, or running paths 17, 19, 121, 122, 123 for the traction means 33, 34, 124 start—viewed opposite the paper running direction—at a sufficient distance ahead of the insertion roller 16, for example the hopper insertion roller 16, on the slide plate 11 at a web pickup line 20 shown in FIG. 1. The web pickup line 20 is to be understood as the line over the width of the slide plate 11 at which the respective movement path of the paper webs, or of the train 08, 140, is intersected on the slide plate 11 by the movement path of the end(s) of the tips of the spikes 35. The paper webs 05 to 07, 12, or the train 08, 140, which are to be drawn into the folding apparatus 116 via the longitudinal folding hopper 18, are drawn, for example up to the web pickup line 20 or beyond it, either by the paper draw-in means respectively assigned to the paper web 05, 06, 07, or are pushed in another way—for example by means of clamping rollers—past this web pickup line 20.

The paper webs 05, 06, 07, etc., or the train 08, 140, are pierced by the spikes 35 of the traction means 33, 34 at the web pickup line 20. To aid this process, one or several driven or non-driven pressure rollers 59, 60, as seen in FIG. 23 are respectively provided in the movement path of the tips of the needle-like spikes 35 projecting out of the slide plate 11. These rollers 59, 60 can have—as already described above—a surface made of a rubber-elastic or metallic material, and can have the circumferential recess 63 at the place where they work together with the spikes 35 (FIG. 7). The dependable threading of the arriving paper webs 05, 06, etc., or of the train 08, 140, on the spikes 35, and therefore on the traction means 33, 34, 124 without damage is intended to be assured by the recess. However, it is also possible to provide rubber-elastic pressure rollers 59, 60 without a circumferential recess 63.

Figure 11:
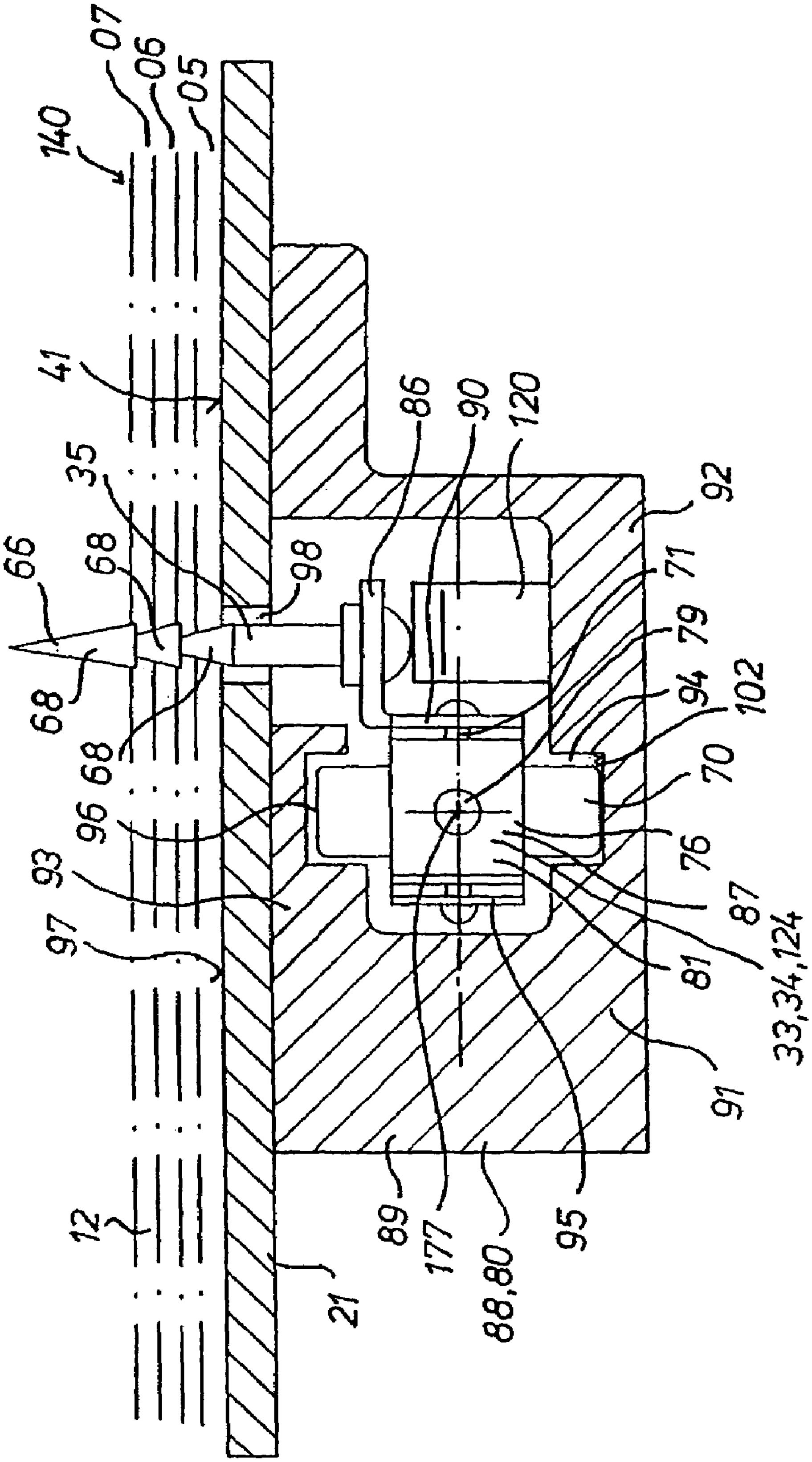

The spikes 35 for traction means 33, 34 124 can be provided, at least at their respective free end 66 facing the paper webs 05, 06, 07, etc., or the train 08, 140, with a device which makes stripping off more difficult, or with a strip-off prevention device 68, as shown in FIG. 11. This device 68 can be designed as a profile of the free ends 66 of the spikes 35, for example in a barb-like manner. For this purpose, the free end 66 can consist of a plurality of truncated cones, placed interlockingly on top of each other, and of an end cone (FIGS. 8 to 12).

However, the free ends 66 can also be designed differently and at least can make the unintended stripping of the webs 05, 06, 07, 12, or of the train 08, 140, off the spikes 35 more difficult. For example, the spikes 35 can be without profiles and can be covered with a material with a high coefficient of friction which, for example, is very coarse-grained, for example coarse-grained corundum.

It is possible to provide one, or several, for example two paths 17, 19, 121, 122, 123 per longitudinal folding hopper 18, and therewith a corresponding number of traction means 33, 34, 124, 87, either of finite or infinite length.

If using only a single path 121, it preferably extends along the vertical center line 25 of the longitudinal folding hopper 18 as far as shortly in front of the hopper projection 24, then through an opening in the hopper insertion plate 21 around a deflection roller 30 behind the hopper plate 21. From there, the path 121 runs over rail guides 80, 88, 89 arranged on the back of the hopper insertion plate 21 (with finite traction means over guide and/or drive rollers, for example 47, 48, 49, 50) and finally to the web pickup line 20.

If using several, for example two traction means, for example 33, 34, 124, running parallel next to each other in a synchronized manner, their respective path, for example 17, 19, extends at a lateral spacing c of several centimeters away from the straight left lateral edge 45, or the straight right lateral edge 51 of the hopper insertion plate 21. From there, the respective path 17, 19 assigned to them leads around the lateral hopper flanks 22, or 23.

The normally provided lateral opening between the left, or right hopper flank 22, 23 and the left hopper folding roller 26, or the right hopper folding roller 27, respectively assigned to them can be closed off by a left hopper flank plate 55, fixed on the hopper, and a right hopper flank plate 65, fixed on the hopper (the hopper flank plates 55, 65, or differently designed covers of the lateral openings (for example rods, gratings) are also advantageous when moving trains 140, which are locked together in a positively locked manner, by material contact, or frictionally locked manner, over the longitudinal folding hopper 18). When employing hopper flank plates 55, 65, the moving traction means 33, 34 cross through respective openings therein in the vicinity of the hopper folding roller 27, or 28, respectively assigned to them and reach the interior of the folding hopper 18. Finally, the path of the traction means leads over guide rollers 43, 44, 47, 48, 49, 50 to the traction means drive wheel 37 and in the end to the web pickup line 20, etc. Traction means 33, 34, 124 can be guided through grooves in a slide face 41 of the former plate 21. In this case, a sufficiently large portion of the traction means 33, 34 is designed without spikes 35. In the course of the draw-in process, the respective traction means 33, 34 is moved synchronously with the arriving paper web, or paper webs 05, 06, 07, 12, of the train 08, 140, in such a way that only the portion of the traction means 33, 34 having spikes 35 moves along the hooper plate 21, or over the hopper cheeks 22, 23. Once the paper webs 05 to 07, 12, or the train 08, 140, have reached the driven hopper folding rollers 26, 27 and have been grasped by them, the traction means 33, 34, 124 are moved in such a way that finally only the portion of the traction means 33, 34, 124, which has no spikes 35, is located on the hopper plate 21 and the hopper flanks 22, 23 and the hopper flank plates 55, 65.

Traction means 33, 34, 124 are respectively driven via their upper stringer 36. For example, and as seen in FIG. 2, belt drive wheels 37, 38 are provided, which have a plurality of take-along pins 39, which work together with holes in the traction means 33, 34, 124, for example, for moving it over the hopper insertion rollers 16 and the upper hopper plate 21. In its upper slide face 41, the hopper plate 21 has a groove for each endless traction means 33, 34, 124.

Traction means 33, 34, 124 can also be designed as toothed belts with spikes 35. In this case, conveying spikes 35 are also only provided on half the total length of the traction means 33, 34, 124. Therefore approximately 50% of its length is designed free of spikes.

For example, traction means 33, 34, 124 can consist of a flexible belt material, for example of plastic or perforated steel tape (for example 0.2 mm thick), or of cables.

Each belt drive wheel 37, 38 (with teeth or spikes) is driven by a drive motor 54, 56, whose position and number of revolutions are controlled. Each traction means 33, 34, 124 is interrogated by a sensor 57, 58 in the area of its lower stringer 46 in order to detect the position of the start of the spike-free area of each traction means 33, 34.

It is possible to control that the area of the traction means 33, 34, 124 having spikes 35 is not in the area of the longitudinal folding hopper 18 at the termination of the draw-in process, i.e. during production.

By means of the sensor interrogation during the draw-in process of paper webs 08, 09 it is furthermore possible to control, that several traction means 33, 34, 124 per longitudinal folding hopper 18 are operated offset from one another in respect to the spike-free area in such a way that one, for example the left or the right traction means 33, 34, 124, is always in positively locked engagement with the paper webs or the train to be drawn in.

When employing traction means 33, 34, 124, 87 of finite length in the area of the hopper flank plates 55, 65, passages 88 are arranged in such a way that the spikes 35 project only at times through respective slits in the hopper flank plates 55, 65 in order to move the threaded paper webs, or the train 140, in the direction toward the hopper folding roller 26, 27. For pushing the paper webs, or the train 140, pressure devices 173, 59, 60, fixed in place on the hopper, or the frame, are provided. When using hopper folding rollers 232 (FIG. 33), which can be divided in the axial direction and can be driven "spaced apart", and using a finite traction means 33, 34, 124 with spikes 35, the draw-in process can take place to any desired depth into the folding apparatus.

Figure 13:
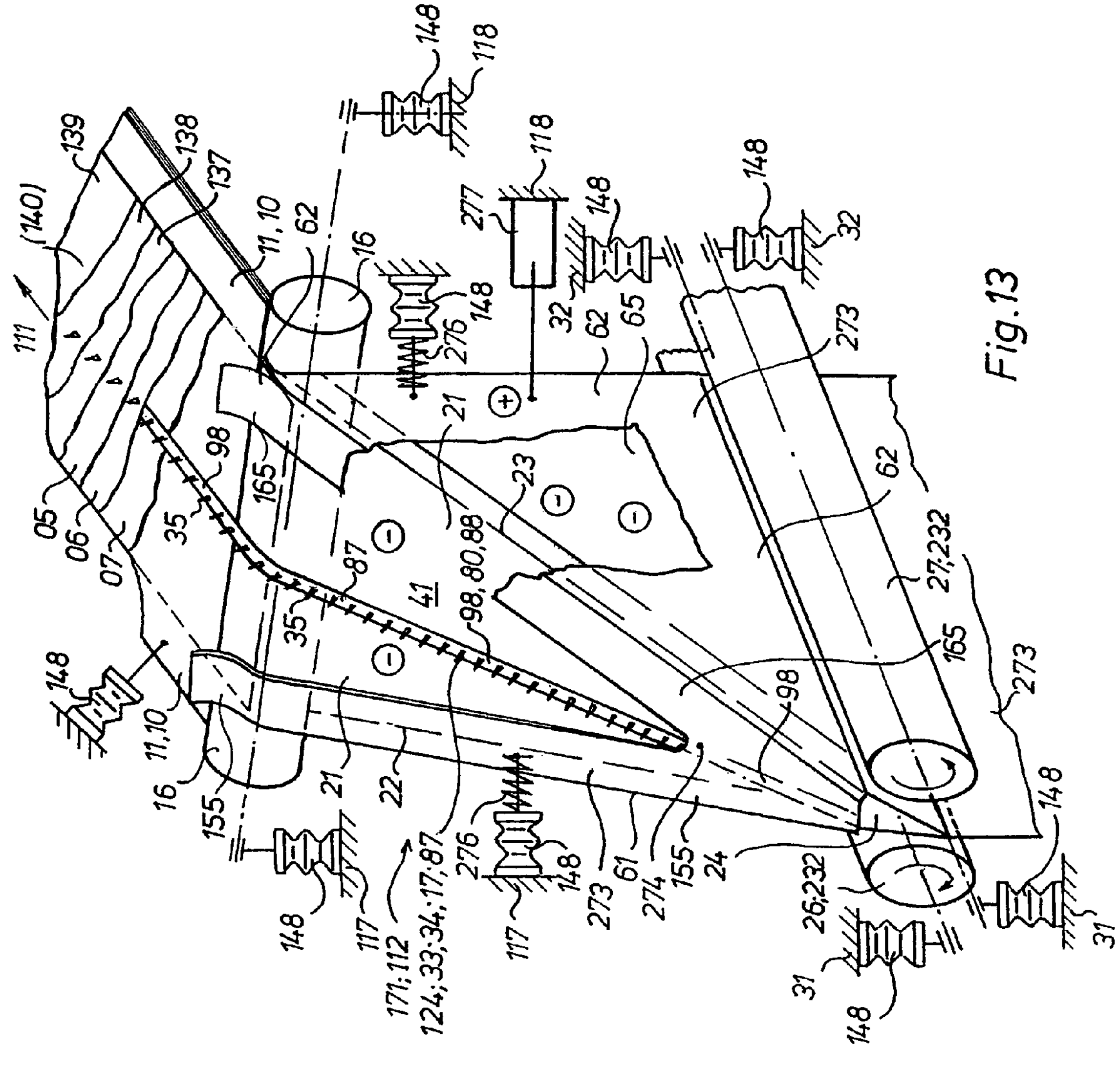
FIG. 13, a longitudinal folding hopper with mechanically driven hopper folding rollers, a driven insertion roller, a slide plate for guiding paper webs, or a locked-together train, hopper flank plates and paper guide devices at a distance therefrom; finite or endless traction means conducted along the center line of the slide plate, the insertion roller, the longitudinal folding hopper. Spikes, projecting out of a longitudinal slit in the slide plate, hopper insertion plate and a groove of the insertion roller. Paper webs, or a locked-together train, threaded on the spikes, with the representation of electric insulators for use in connection with the electrostatic positive locking of individual paper webs to form a locked-together train, and selectively additional device.

When drawing in paper webs by use of finite or endless traction means, or individual draw-in devices without traction means (for example pushing or pulling a locked-together train) by non-positive locking effects, or of a train 140, along the hopper insertion plate 21 of the two hopper flank plates 55, 65, it can be very helpful to provide a hopper guide device 273, as seen in FIG. 13.

The hopper guide device 273 consists of an upper hopper cover plate 274. It is located opposite the hopper insertion plate 21 and is spaced apart from it and can cover it completely or partially. A left, 61, and a right guide device 62 are connected by material contact or by positive locking with the hopper cover plate 274. They are spaced apart from the hopper flank plates 55, or 65, respectively located opposite them.

These guide devices 61, 62 can, for example, consist of one or several rods, perforated plates, or a plate with a closed surface. They are respectively matched to the cross-sectional shape of the hopper flank plates 55, or 65.

For example, the guide devices 61, 62 respectively start shortly above the upper end of the hopper flank 22, 23, and respectively terminate shortly in front of the driven hopper folding roller 26, 27 assigned to them.

The distance of the guide devices 61, 62 from the hopper flanks 22, 23 and the hopper flank plates 55, or 65, has been selected to be such, for example, that spikes 35 can move in the space between the hopper flank plates 55, 65 and the guide devices 61 without the tips of the spikes being able to come into contact with them. However, it is also possible to select an arrangement wherein the tips of the spikes 35 pass through the longitudinal grooves or longitudinal slits in the guide plates of the lateral guide devices 61, 62 in the vertical direction. To this end, it is then necessary for the lateral guide devices 61, 62 to consist of one or several rods, which are longitudinally oriented in the running direction of the paper web and are spaced apart from each other, between which at least the tips of the spikes 35 move. It is achieved by this that the spiked paper webs, or the train 08, 140, cannot come free of the spikes 35.

The just described lateral guide devices 61, 62 can be employed in connection with paper web draw-in devices by means of the longitudinal folding hopper 18, when using traction means 33, 34, 124, 87 that may be of either endless or of finite length. But also with paper web draw-in devices by means of the hopper 18 wherein, prior to entering into the hopper folding rollers 26, 27, the individual paper webs to be drawn into the folding apparatus 116 via the hopper 18 are connected with each other by resting on each other with a material connection (for example by gluing, parchmentizing, cold welding), positively locked (for example by stapling, sewing, penetration perforating, stapling together tongues), or non-positively locked (for example electrostatic train stapling), i.e. are "locked together" with each other.

When employing endless traction means 33, 34, 124, which may be endless and with spikes 35, the device operates as follows:

All drive motors 54, 56 are, for example, embodied as frequency-controlled rotary current motors. For example, it is possible to provide 4 to 10 drive motors per traction means 33, 34, 124. They are controlled as to angle of rotation and number of revolutions and run synchronously with each other.

The drive motors 54, 56 drive the belt drive wheels 37, 38. At the beginning of the draw-in process and when several draw-in belts are employed, one of them is started with a delay in time. It is achieved by this that when the paper webs, or the train 08, 140, arrives in the web, or train, pre-entry device 111 (FIGS. 1 to 4), they are always picked up and moved by conveying spikes 35. The pressure rollers 59 for each traction means 33, 34, 124 cooperate in this. Shortly prior to the first leading paper web start reaching the hopper folding rollers 26, 27, the paper web 05, 06, 07, etc., or the train 08, 140, is respectively lifted off the conveying needles 35 by a fork-shaped stripper 69, and thereafter is conveyed to the already turning hopper folding rollers 26, 27 by pushing.

Immediately following the end of the draw-in process—i.e. in the course of the production by means of the longitudinal folding hopper—all traction means, for example 33, 34, 124, 87 are moved in such a way and finally stopped, that in the areas of the web, or train, pre-entry device 111 and the longitudinal folding hopper 18 there are no longer spikes 35 projecting into the movement path of the webs, or of the train, but only the portion of the traction means 33, 34 which no longer has spikes 35. The spikes 35 are respectively in the area of the lower stringer 46 of the endless traction means 33, 34, 124. Because of this, it is assured that paper webs, or the train 140, running in the movement path in the production direction can move through the folding hopper 18 unhampered.

With tabloid production intended, respectively a second, separately drivable, inner traction means is assigned to each outer traction means 33, 34, either finite or endless, per longitudinal folding hopper 18. The additional "inner" second traction means are respectively arranged to be driven phase-shifted, but at the same circumferential speed as the "outer" first traction means 33, 34 assigned to them. This arrangement has the advantage that longitudinally cut paper webs for creating tabloid products can also be drawn in via the folding hopper 18.

It is also possible to embody the traction means 33, 34 for example as a cable, chain or toothed belt.

The traction means 33, 34, 124 can, however, be designed finite—as already stated above—. In that case, they are moved in guides 88 fixed on the frame (FIG. 22), or guides 80 fixed on the folding hopper (FIGS. 11, 12, 13, 21, 22, 24).

Driving chains, for example sleeve-type, toothed or roller chains, but also toothed belts, are particularly suited as traction means 33, 34, 124 of finite length. (When using chains, roller chains movable in a guide device are particularly suited. Such chains have become known, for example, from U.S. Pat. No. 5,201,269, FIG. 18).

Here, the roller 70 of the traction means 33, 34, 124, for example roller chains (FIGS. 8, 9, 10, 11, 12) are rotatably seated on bolts 71. The respectively left tongue 81 and right tongue 82 of a first fork 72, and the two tongues 90, 95 of a second fork 73 are also hingedly seated on the bolt 71. The tongues of the forks 72, 73 are spaced apart from each other in such a way that they can be respectively pivoted together around the bolt 71. The two tongues 81, 82 of the first fork 72 are materially connected, for example by welding, with a first base element 76, and the two tongues 90, 95 of the second fork 73 are connected positively locked with a second base element 77. The two forks with the bolts 71 and the roller 70 respectively form a chain link 78, 83, 84. Immediately adjoining chain links 78, 83, 84 are hinged to each other via respective, oppositely located base element 77, or 76, transmitting pushing and pulling forces, and are positively locked together by means of a turning knuckle 79. The turning knuckles 79 must have at least a degree of freedom f=2 (universal joint). Naturally, joints of higher degrees of freedom f=3 (for example ball joints) can also be employed.

Figure 24:
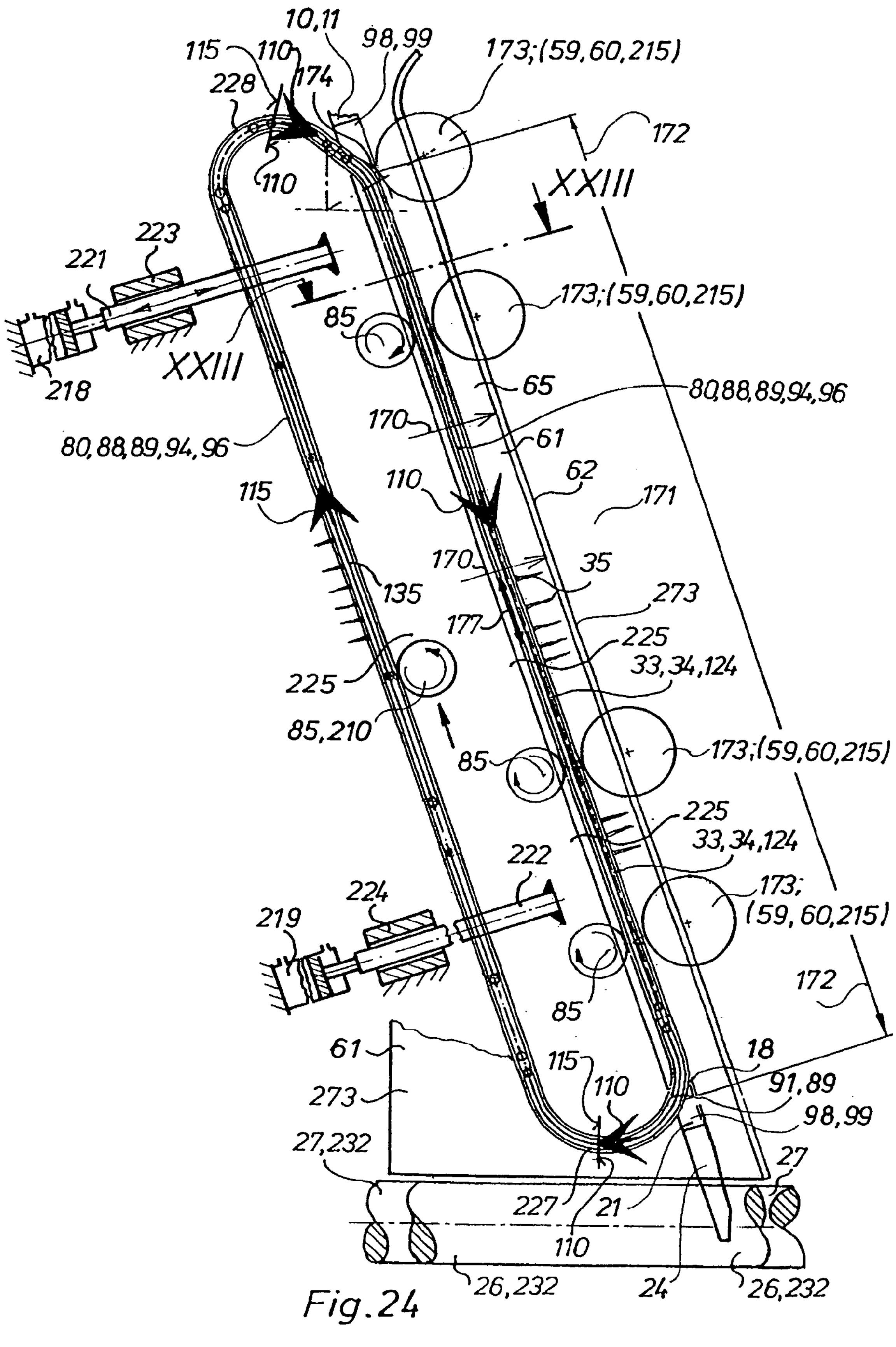

Support elbows 86 are fastened, for example welded, preferably on the outside-located tongues 90, 95, for fastening spikes 35 (FIGS. 8, 9, 10, 11, 12). However, the support elbow 86 can also be fastened materially connected (for example spot-welded) to the tongue 90, 95 assigned to it. The support elbow 86 can also be designed as a bevel of the tongue 90, 95 itself, as represented in FIGS. 8 to 12. The support elbow 86 with its spike 35 can also be arranged on the outside-located tongues 90, 95 pivotable in or against the movement direction of the traction means 33, 34, 124 carrying them in order to selectively raise or fold the spikes 35 down prior to their arrival, for example, in a preselectable area of the hopper insertion plate 21, or of the longitudinal folding hopper 18 (FIG. 24). To achieve the same effect, it would be possible to arrange only the spikes 35 pivotably (FIG. 25), or so that they can be lifted and lowered on the traction means.

The manner of effecting a positively locked connection of paper webs, or of a train 140, conveyed over the slide plate 11, with the traction means 33, 34, 124, 07 having needle-like spikes 35, is basically the same with traction means of either finite or infinite length. This is represented in FIG. 2. Shown there is that the arriving paper webs/train are grasped by the pair of combining roller 03/pressure roller 04 and reach the pickup area of the downstream connected, driven pair of pressure rollers 59, 60/traction wheels 37, 38.

It is important that an insertion wedge consisting of pressure rollers 59, 60 and of the conveying traction means 33, 34, 124, 87 of either finite or infinite length, and running in against the pressure roller 59, 60, is created. Once the paper web, or the paper webs, or a train 08, 140, get between the pressure rollers 59, 60 and the traction means 33, 34, 124, 87 with the needle-like spikes 35, the web, or the webs, or the train 140, are pushed by the pressure roller 59, 60 on the needle-like spikes 35 of the moving traction means 33, 34, 124, 87 down to their base. The train 140, or the webs are now threaded on the traction means 33, 34, 124, i.e. connected with them in a positive lock. The traction means 33, 34, 124 now pull, or push the threaded paper webs, or the train 08, 140, over the longitudinal hopper 18 into the capture area of the hopper folding rollers 26, or 27.

Figure 12:
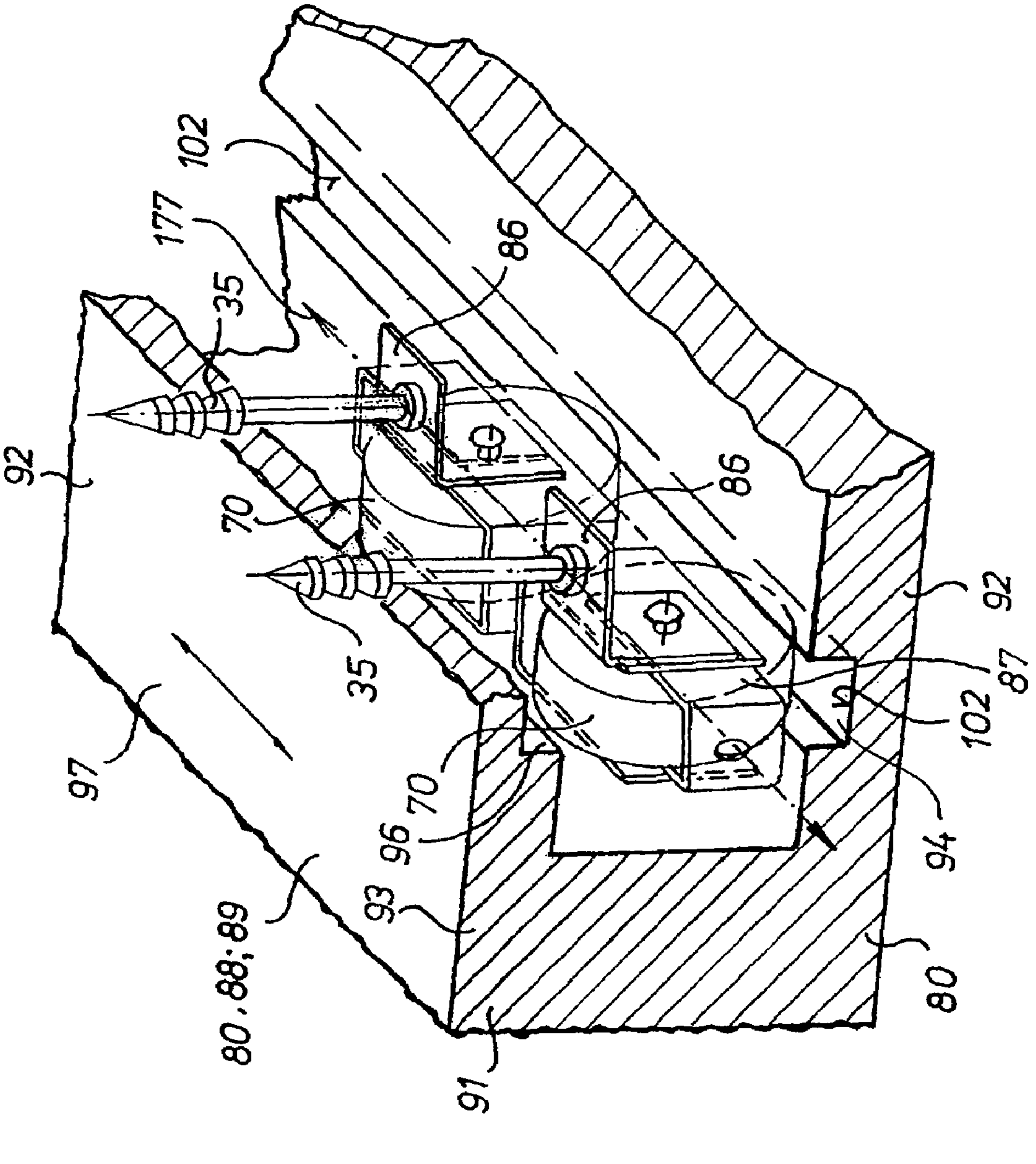

In order to be able to move the finite traction means 33, 34, 124, 87, “endless” guides 88 fixed on the frames, or guides 80 fixed on the longitudinal folding hopper, are provided. Such guides 80, 88 are represented as examples in FIGS. 11, 12. The guides 80, 88 can, for example, be designed as profiled strips 89 of the type shown in U.S. Pat. No. 5,396,982, and as seen in FIGS. 1, 11 and 12. The strips 89 essentially consists of a C-shaped profiled element with a base body 91 and lower legs 92 and upper legs 93 extending at right angles therefrom and parallel with each other. The lower leg 92, as well as the upper leg 93, have a lower longitudinal groove 94, or an upper longitudinal groove 96, respectively. Both longitudinal grooves 94, 96 are used as guides, on the one hand, and also as a running surface for the roller 70 of the traction means 33, 34, 124, 87. The base body 91 has a mounting surface 97 on its top.

Figure 22:
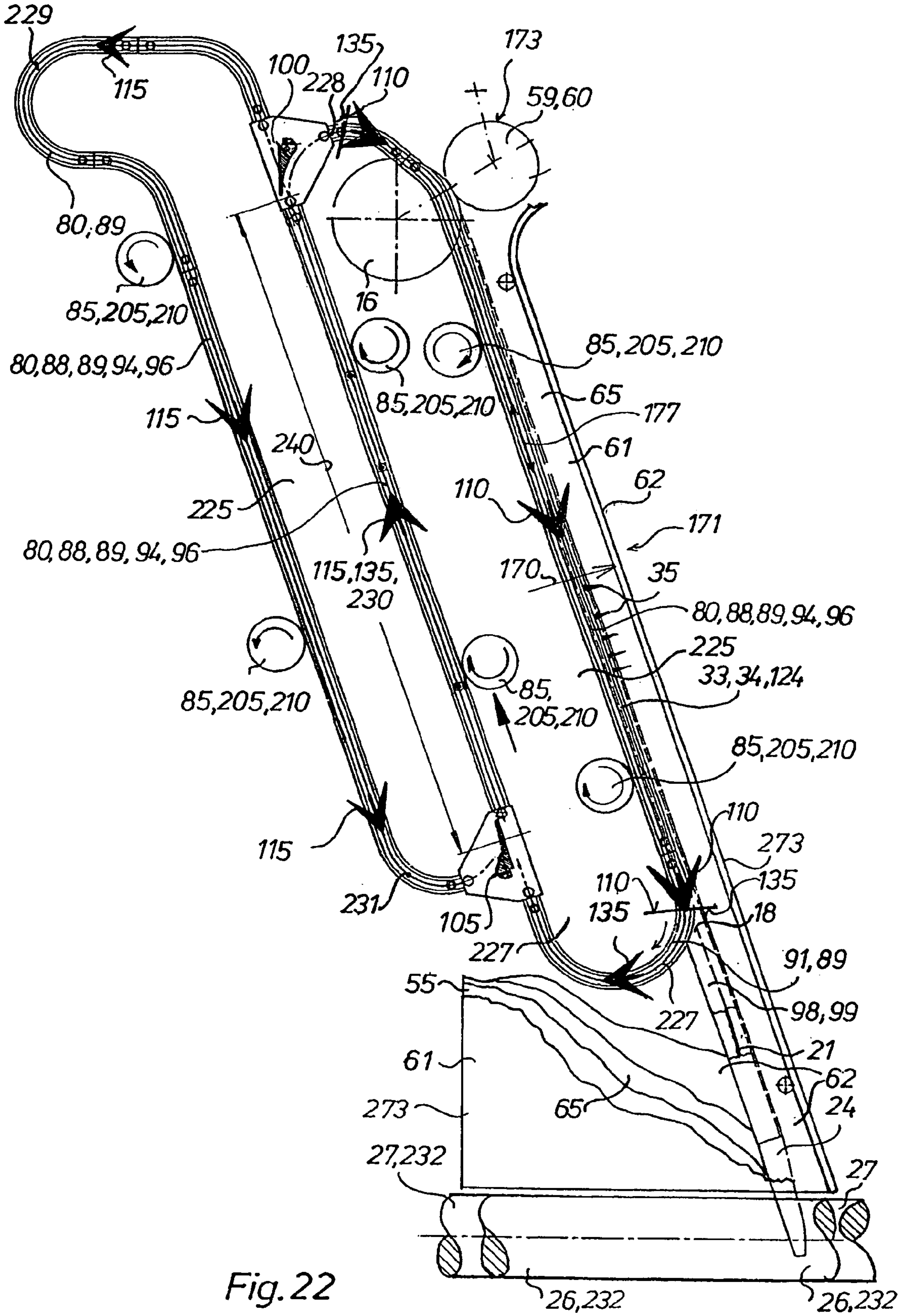
Figure 30:
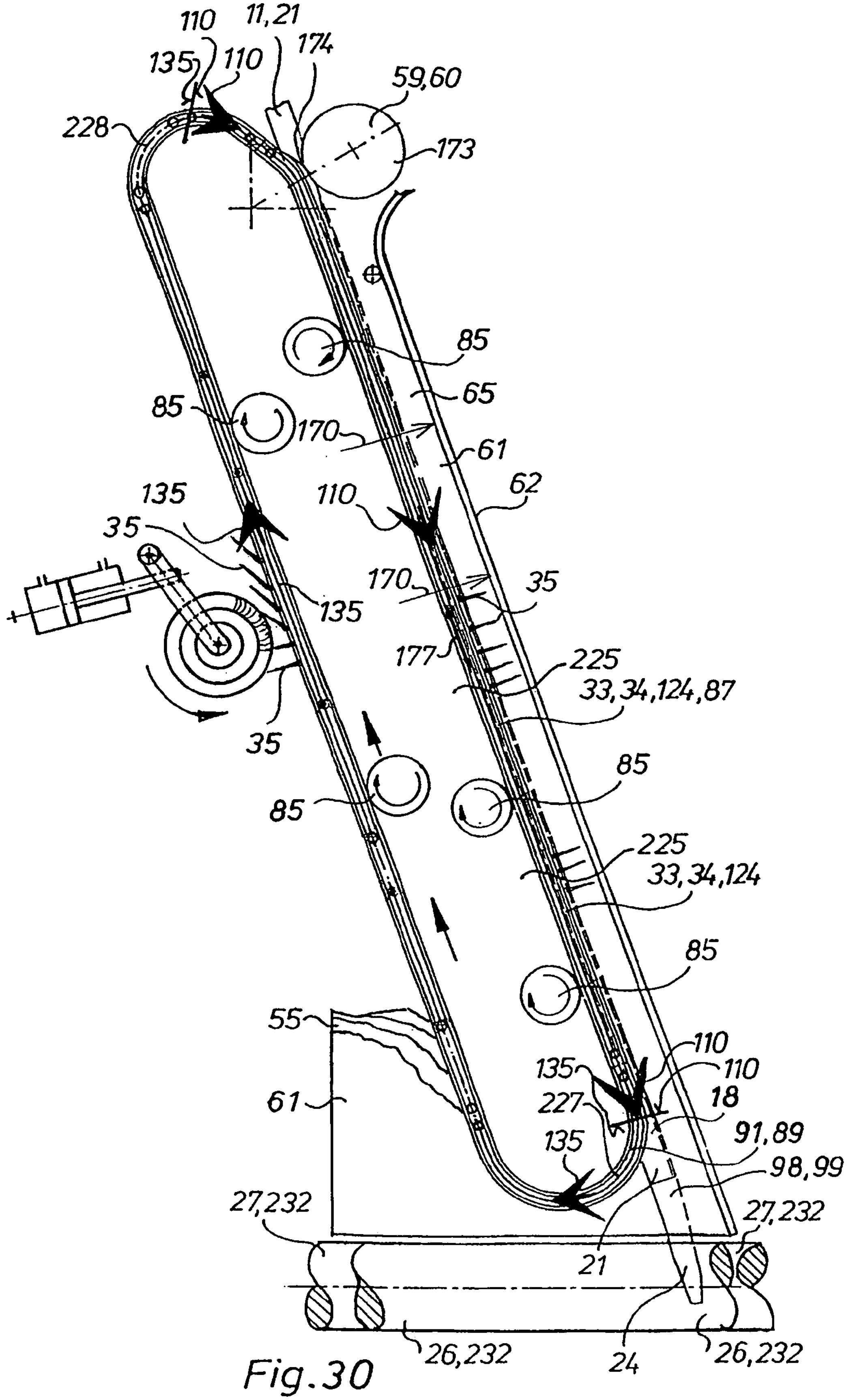

With the preferred embodiments represented in FIGS. 13, 22, 30, the guide 80, 88 in the form of a profiled strip, for example (FIGS. 11, 12), is designed in such a way and respectively fastened on an underside of the slide plate 11, the hopper plate 21, hopper flank plate 55, 65, that with a movement of the traction means 33, 34, for example in the form of a toothed belt or a draw-in roller chain 87, their spikes 35 project through the longitudinal slit 99, or 98, and can dependably pierce the paper web, or paper webs 05, 06, 07, 12, or the train 08, 140.

Traction means 33, 34, 124, 87 of either finite or infinite lengths, with spikes 35 are suitable for the application of unconnected paper webs, as well as for several paper webs locked together into a train 140.

As represented in FIG. 13, for example, a longitudinal slit 98 exists in the hopper plate 21 along its longitudinal axis of symmetry. The longitudinal slit 98 starts immediately adjoining the periphery of the hopper insertion roller 16, or also the guide roller 16, and terminates shortly before or in the hopper projection 24. The slide plate 11 in front of the hopper insertion roller 16 also has one or several longitudinal slits 99 extending in the running direction of the paper web. The longitudinal slits 98, 99, for example along the longitudinal axis of symmetry of the slide plate 11 and hopper plate 21, are required if only a single or if three traction means with spikes 35 is/are guided over the hopper plate 21, or over the slide plate 11. Each of the longitudinal slits 98, 99 is only slightly wider than the respective diameter of the spikes 35. Because of this, the spikes 35 are laterally guided and cannot tilt.

Hopper flank plates 55, 65 can be designed similar to the design of the hopper plate 21 if it is intended to move the spiked paper webs 05, 06, 07, 12, or the train 08, 140, along them by the use of the traction means 33, 34, 124, 87 of finite or infinite length.

Figure 33:
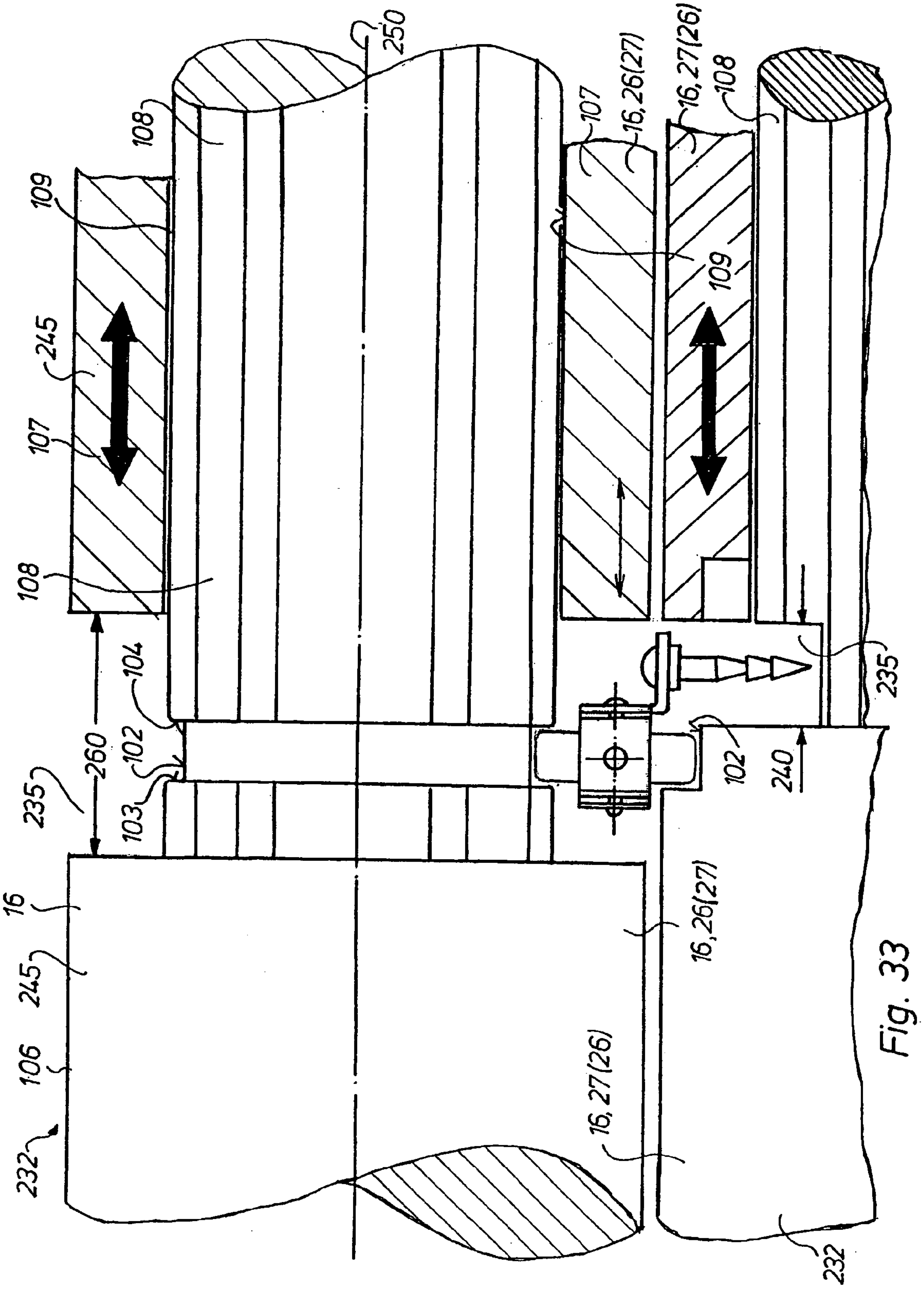

So that the traction means 33, 34, 124 can get directly out of the area of the slide plate 11 into the area of the hopper plate 21, it is necessary to get past the hopper insertion roller 16. It is necessary that it be cut in at this location sufficiently wide and deep by a recess 101 along an imagined extension from the guides of the slide plate 11 to the hopper insertion plate 21. Because of this, proper guidance for the traction means 33, 34, 124, for example the draw-in roller chain/toothed belt, is formed even in this short area. As shown in FIG. 33, the recess 101 can include a running face 102 which can be stepped so that a left roller guide face 103 and a right roller guide face 104 for the rollers 70 of the traction means 33, 34, 124 are provided, the same as in connection with the profiled strip in accordance with FIGS. 11 and 12.

The hopper insertion roller 16—but also every other roller, for example the hopper folding rollers 26, 27, which "must let pass" a traction means 33, 32, 124, for example in the form of a roller chain, of a toothed belt—can be embodied to be either in one piece, for example with a passage 235 of fixed width 240, or divided—i.e. capable of being selectively axially pushed apart, as shown in FIG. 33, so that a passage 235 of a selectable width 260 results. In this case, a barrel 245 of the roller 16, for example hopper insertion roller 16, is divided into a left element 106 and a right element 107. These elements 106 and 107 are arranged so that they can be axially displaced on or in each other. At least one of the two elements 106, 107 of the roller 16, or both, are axially displaceable and are arranged so that they are seated so they can be locked in place in their respective positions. In the preferred embodiment of the divided hopper insertion roller 16 represented in FIG. 33, the left hopper insertion roller element 106 has a long multi-splined shaft or pin 108 extending toward the right. The multi-splined shaft or pin 108 can be embodied as a serrated tooth pin, or also as a K-profile pin, etc. The multi-splined pin 108 of the left element 106 of the hopper insertion roller 16 (pin element 108) dips into a bore 109 of the right hopper insertion roller element 107 of the roller 16. The surface area of the bore 109 is profiled in such a way that the multi-splined shaft or pin 108 and the bore 109 form a tight sliding seat. During production, the pin element 108 and the sleeve element 107 of the roller 16 are moved together so far, that sufficient space for the entry of a rotating cutter remains. The elements 106, 107 are maintained in place in this position.

The pin element 108 and/or the sleeve element 107 each can be placed at a distance from each by a coupling supported on the lateral frame, for example an interlocking switching coupling, for example a claw switching coupling, in such a way that a sufficiently wide opening 260 for the traction means 33, 34, 124, 87 is formed at times.

It would also be possible to employ a multi-splined shaft 108 extending through both elements 106, 107. The multi-splined shaft 108 would be seated at both ends in respective lateral frames so that it would be rotatable and driveable, for example by a position-controlled motor.

Because of the employment of the above described traction means 33, 34, 124, 87, which respectively have needle-like spikes 35, it is therefore possible in an advantageous manner to introduce, without manual intervention, one or several paper webs, or a train 140, composed of several paper webs, via the longitudinal folding hopper 18 at least as far as the driven hopper folding rollers 26, 27, which grip them when the gap has been appropriately set. The hopper folding rollers 26, 27 either push or pull the gripped combined train 140 further into the folding apparatus 116.

With this embodiment, the movement of the paper webs, or of the train 140, via the longitudinal folding hopper 18 takes place by means of an interlocking connection—for example by threading on the spikes 35—of the paper webs, or of a train 140, with the traction means 33, 34, 124, 87.

Interlockingly maintained in this way on one or several traction means 33, 34, 124, 87, the paper webs/train 140 reach the "catch area" of upper cover plates 155, 165 and lateral guide devices 61, 62 (FIGS. 1, 13), which are arranged spaced apart from the hopper insertion plate 21 and the hopper flank plates 55, 65 and are embodied to be flat or rod-shaped. These guide devices have the task to "deflect" the moving paper webs, or the train 14, around the two hopper flanks 22, 23 of the longitudinal folding hopper 18 and to guide them/it along the inner guide faces 75, 85 of the lateral paper guide devices 61, 62 until they/it finally reach(es) at least the draw-in area of the driven hopper folding rollers 26, 27. For this reason, the lateral guide devices 61, 62 terminate shortly ahead of the surface area of the hopper folding roller 26, 27 assigned to it.

The hopper folding rollers 26, 27 can be of the same construction as the insertion roller 16, i.e. they can be capable of being pushed apart axially in the area of the movement paths of the traction means 33, 34, 124 (FIG. 33). When using a traction means 33, 34, 124, 87 of finite length and with spikes 35 and with hopper folding rollers 26, 27, which can be moved apart to form a "gap" and can be moved spaced apart, it would be possible to pull the paper webs, or the train 140, by an interlocked connection with the spikes 35 through the area of the hopper folding roller 26, 27, for example up to the transverse cutting unit of a transverse folding unit. The guides for the traction means upstream and downstream of the inlet into the hopper folding rollers 26, 27 can be automatically moved in such a way that, when the hopper folding rollers 26, 27 are axially moved together into an operating position, no interference with the running of the train 140 by the guides is possible.

Thus, the employment of a traction means 33, 34, 124 of finite length in rail-like guides 80, 88, 89, 94, 96 makes it possible to also pass through "obstacles", for example 16, present in the provided movement path of the traction means 33, 34, 124, in that a fixed or adjustable passage 235 is provided.

In this connection, it is advantageous to terminate the rail-like guide 80, 88, 89, 94, 96 at the height of the passage 235 shortly before the "obstacle"—for example an insertion roller 16 or hopper folding roller 26, 27—, and to continue it afterwards directly following the "obstacle". Thus, it is possible to move through the "obstacle".

It may be necessary following the end of the draw-in process to remove, for example, a part of the rail-like guide 80, 88, 94, 96, out of the provided movement path, or to move it partially out of it in another way, upstream or downstream of the "obstacle". This means that the movement path is "cleared" over a part of the rail-like guide. This is very appropriate, for example, if the movement path of the traction means 30, 33, 124 is provided within the barrel length (for example, half the barrel length). The position of the movement path, for example on one-half of the barrel length, would be advantageous in that the perfect and assured draw-in of the train 140 through the gap between the hopper folding rollers 26, 27 is made possible. However, under production conditions, a fixed guidance over a defined length would be a hindrance because the running train 140 might touch the rail-like guide.

Among the options of "clearing" would be, for example, the complete temporary removal or pivoting or bending of a partial element of the rail-like guide upstream and/or downstream of the "obstacle". In this connection, it would also be advantageous to embody, for example, the ends shortly upstream or downstream of the "obstacle" in a telescope-like manner, or to fasten them to a four-bar linkage.

It is also possible, for example, to conduct a train 140 from a first longitudinal folding hopper 18 to a train of a second longitudinal folding hopper and to place it "on top" of the latter, and thereafter to feed the two trains placed on top of each other to a transverse cutting unit, and then to a transverse folding unit, or to other units, for example.

As already stated above, it is possible to provide one or several traction means 33, 24, 124, 87 of either finite or infinite length with needle-like spikes 35 next to each other. It is also possible to provide traction means 33, 24, 124, 87 of either finite or infinite length along the lateral hopper flank plates 55, 65. When using finite traction means with needle-like spikes guided in guide rails 80, 89, 88, these guides 80, 89, 88 are fastened to the underside of the hopper insertion plate 21, or on the inside of the hopper flank plates 55, 65. The guides 80, 89, 88 are attached in such a way that a sufficient length of the spikes 35 can project through the slits in the plates 21, 55, 65. If the traction means 33, 34, 124 are not to lead through the operating area of the hopper folding rollers 26, 27, or if no hopper folding rollers 26, 27, which can temporarily move apart in the axial direction for forming a "passage" for the finite traction means, are to be used, the spikes 35 of the traction means of either endless or finite length, and which project out of the hopper flank plates 55, 65, must drop into the interior of the longitudinal folding hopper 18 in the vicinity of the hopper end.

Thus, even when the spikes 35 "drop away" into the interior of the longitudinal folding hopper 18, it is assured that the threaded paper web, or webs, or train 140, are further conveyed in the direction of the rotating hopper folding roller 26, 27.

Therefore, the invention also makes it possible to draw in individual webs, which are not connected with each other, at least into the rotating hopper folding roller 26, 27, which then grasp them and convey them on.

Another possibility for drawing in several paper webs, or a train 140, via a longitudinal folding hopper 18 at least far enough until the hopper folding rollers 26, 27 grasp them, is seen to lie within the scope of the invention in that the paper webs, which individually arrive in the direction toward the hopper insertion roller 16, are combined into a train 140, i.e. are "locked together", and are subsequently moved over the hopper.

Such a "locking-together" can be designed as an interlocked connection. Options for interlocking several paper webs with each other into a "locked-together" train 140 could be, for example, clipping together by means of staples (FIG. 19), "tacking", tongue-stitching (FIG. 18), thread-stitching (FIG. 20), and of course also pressing the webs, or the trains 140, on spikes 35 of movable traction means, such as belts or chains (FIGS. 3, 4, 5, 6, 8, 9, 10, 11, 12), cables, toothed belts. Sewing the paper webs together to form a "locked-together" train 140 would also be possible.

Figure 14:
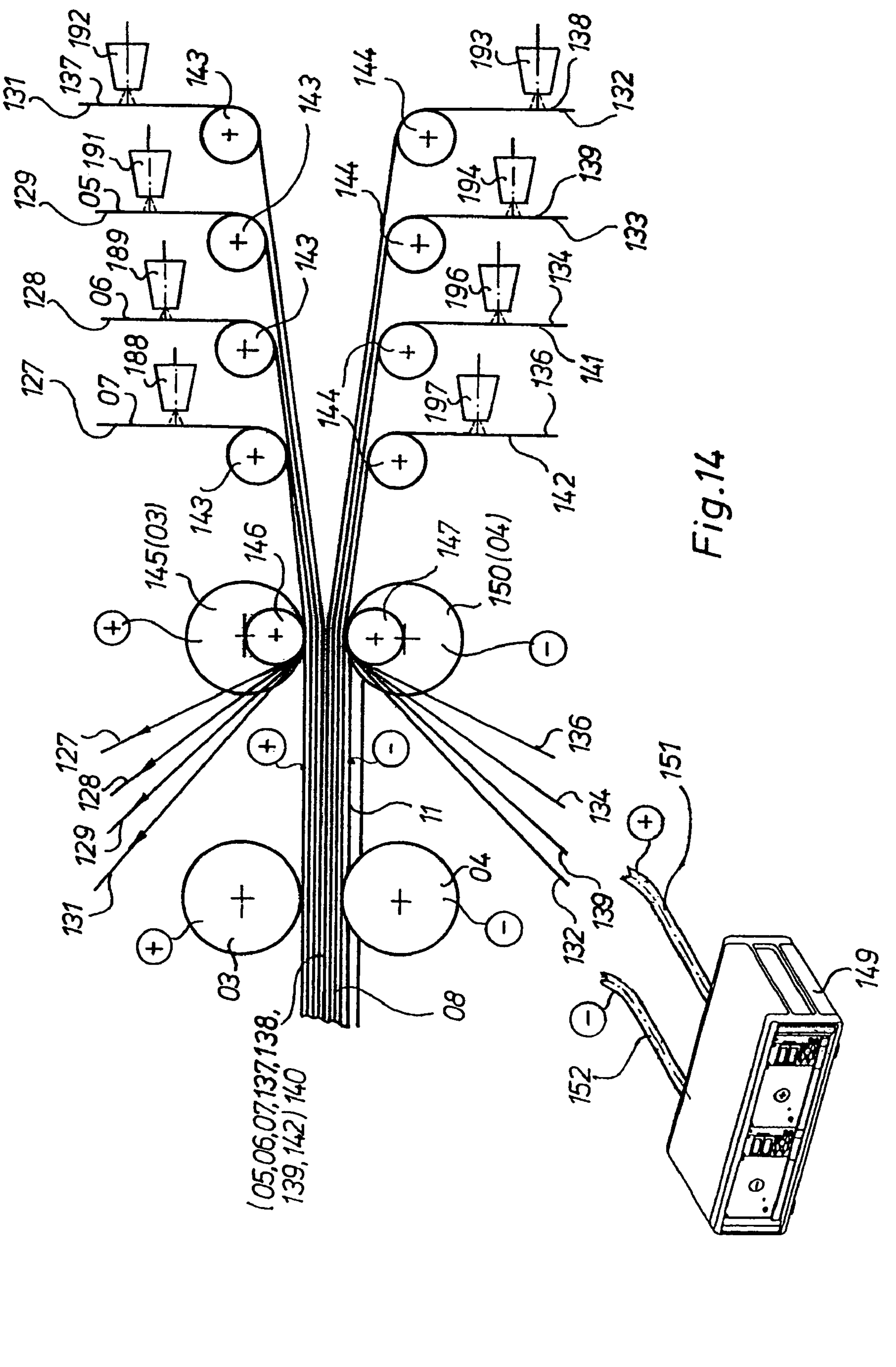
FIG. 14, a schematic representation of devices for positively locking several paper webs to form a locked-together train by using rotating, roller-shaped charge electrodes for electrostatic positive locking. Furthermore, an alternative device for positively locking the materials by contact with the use of adhesives for positively locking several paper webs by contact to form a locked-together train. Moreover, an optionally usable device for generating mechanical oscillations (vibrations) of the guide device for the paper webs, or of the locked-together train, at the longitudinal folding hopper, FIG. 15, a device for connecting the material by contact of two paper webs placed on top of each other by beading, FIG. 16, a schematic representation of a drive mechanism for a hammer roller (beading roller), FIG. 17, a section taken along line XVII—XVII in FIG. 16, FIG. 18, a tongue-stitching device in a schematic view for creating a positively locked paper train from a plurality of paper webs, FIG. 19, a stapling device with metal staples in a schematic view for creating a locked-together train from several paper webs, FIG. 20, a thread-sealing device in a schematic representation for creating a positively locked connection of several paper webs to form a locked-together train, FIG. 21, an elongated guide device, which can be moved back and forth on a hopper insertion plate, intended for the circulation of an endless or of one or several finite driven traction means, whose spikes in the area of the hopper insertion plate are oriented toward the latter, for the purpose of conveying individual or several paper webs or of a locked-together train arriving on the hopper insertion plate, FIG. 22, a schematic representation of a device for driving and guiding finite traction means with spikes, which project, at least at times, into the path of paper webs, or of a locked-together train, through a longitudinal slit of a guide plate (operative guidance) and thread them, having an additional circulating storage device for the endless traction means, wherein the operative guidance and the storage guidance can be connected with each other, or tested, by means of controllable shunts, FIG. 23, a device for generating a clamping pressure between several paper webs placed on top of each other and a traction means, and/or for pushing the paper webs, which have been placed on top of each other, on spikes, and a drive mechanism for traction means for finite or endless traction means with or without spikes, FIG. 24, a guide device for finite or endless traction means with or without spikes, arranged below a running plate on a guide support. The guide support can be moved in and opposite to the running plate in such a way that, when using traction means without spikes, the traction means itself or, when using traction means with spikes, the spikes are arranged so that they can be brought through a longitudinal slit in the running plate into a position above the sliding surface of the running plate, i.e. into the path of the paper webs, or of the trains, FIG. 25, spikes which can be raised and lowered and are fastened on traction means, FIG. 26, spikes in an upright position, which are fastened pivotably (tiltably) on traction means, FIG. 27, a section taken along line XXVII—XXVII in FIG. 26, FIG. 28, spikes, which are fastened pivotably (tiltably) on traction means and are pivoted (tilted) in the draw-in direction, FIG. 29, a section taken along line XXIX—XXIX in FIG. 28, FIG. 30, a stationary, extended guide device arranged below a running plate, intended for the circulation of an endless, or of one or several driven traction means with pivotable spikes, and an arrangement for “pivoting/tilting” and return into the upright position of the pivoted/tilted spikes, FIG. 31, an arrangement for “pivoting/tilting” and “return into the upright position” of the spikes, wherein the arrangement acts on the return path.
Figure 16:
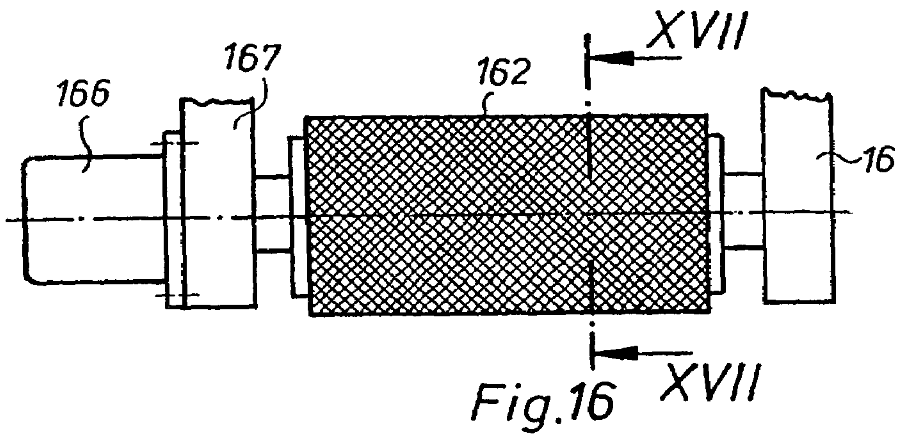
Figure 15:
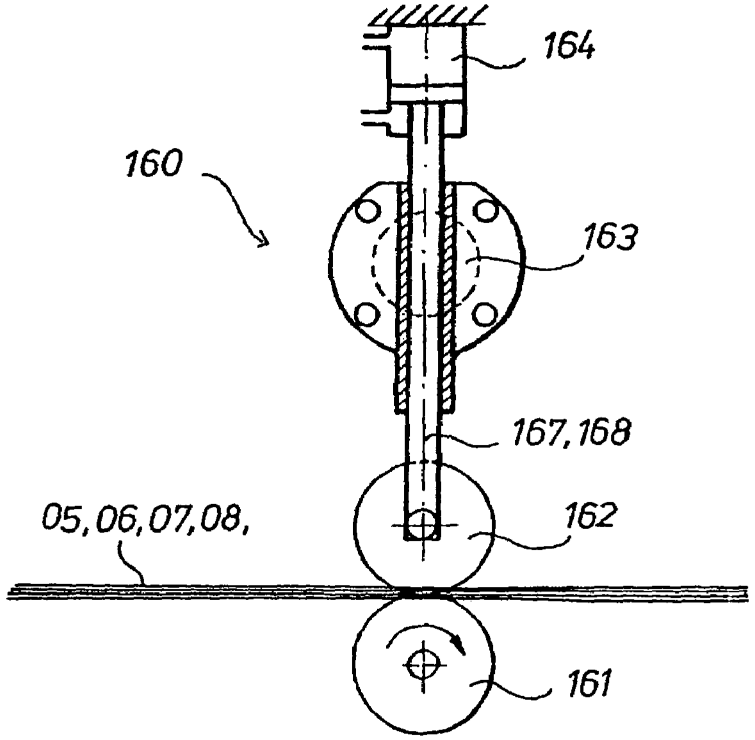
Figure 17:
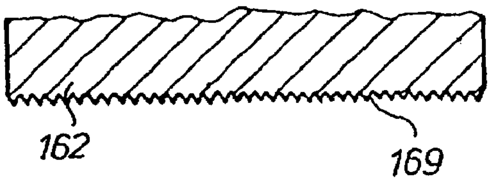

A further possibility to connect several paper webs with each other, i.e. to lock them together, could take place by a connection of the materials themselves. In this case, the application of a continuous or an intermittent contact adhesive track, or spraying a contact adhesive (glue) (FIG. 14) on the back of the paper webs, followed by pressing them together between two rollers, for example 03, 04, is particularly suitable. Also, beading under high pressure, for example (cold welding), such as represented in FIGS. 15, 16 and 17, would be a possibility of connecting the materials, or of locking them together.

It would also be possible to connect several paper webs into a train 140 by a frictional connection, i.e. to "lock them together". For example, this would be possible by use of the so-called electrostatic locking-together by charging the paper webs with a high-tension d.c. voltage of several thousand Volt, for example. Devices for this are represented in FIGS. 13 and 14.

The first method is distinguished by "threading" paper webs, which are not connected with each other. The principle of the second method is to lock together a plurality of paper webs, at the latest in the area of the start of the hopper flanks 22, 23 of a longitudinal folding hopper 18, in an interlocked and/or frictionally locked and/or material-connected manner, to form a "locked-together" train 140, and to pull or push it in this state into, or only into the direction of the hopper folding rollers 26, 27. In the course of drawing in paper webs forming a so-called "locked-together train 140" connected in this manner, the lateral guide devices 61, 62 are of importance, which are laterally distanced from the hopper flank plates 55, 65 and which cover them totally or partially. The locked-together "spread out" train 140 first reaches the area of the start of the hopper flanks 22, 23, for example along the hopper insertion plate 21 (FIG. 13, FIG. 1). In the course of its further movement in the direction toward the hopper projection 24, the locked-together train 140 meets with the inside surfaces of the lateral guide in the form of the lateral guide devices 61, 62.

The lateral guide devices 61, 62 are located at a distance (for example 5 cm) opposite the respective hopper flank plates 55, 65. Toward the top they make a respective transition into the left 155, or right cover plate 165. They cover a wider strip (approximately 10 to 20 cm wide) of the hopper insertion plate 21 respectively along the hopper flanks 22, 23, starting in the area of the insertion roller 16 and terminating close to the wide end of the hopper projection 24. They are spaced apart—for example between 5 and 10 cm—from the hopper insertion plate 21 in order to guide the paper webs, or the train 140, unhindered into, or through the gap between the hopper folding roller 26, 27. The left and right hopper flanks folding plates 55, 65 are connected from near the wide end of the hopper projection 24, so that from there on they form a continuous hopper cover plate 274. Together with the hopper flank plates 55, 65 and the hopper cover plate 274, the lateral guide devices 61, 62 constitute the hopper guide device 273 (FIG. 13).

If now the beginning of a paper web threaded on spikes 35 of a traction means 33, 34, 124, or of a locked-together train 140, or of a train 140 pushed by other means, arrives in the guide area of the cover plates 155, 165, it is moved between the inside of the cover plates 155, 165 and the hopper insertion plate 21. The upper cover plates 155, 165 prevent the locked-together train 140, or the paper webs placed on top of each other, from being upwardly carried off. Now, in the course of their/its further movement, the webs, or the locked-together train 140, laterally meet the inner surface of the guide devices 61, 62 extending in the direction of the hopper folding rollers 26, 27, and are in this way deflected around the hopper flanks 22, 23 downward in the direction of the hopper folding rollers 26, 27. By use of further pushing movements, the paper webs, or the locked-together train 140, reach at least the catch area of the rotating hopper folding rollers 26, 27. These hopper folding rollers 26, 27 can either already be at a folding distance, or can also be placed further apart.

They are then placed at the folding distance only after the report of the arrival, or shortly before the arrival, of the paper webs, or the locked-together train 140, between the hopper folding rollers 26, 27, and then take over the traction of the paper webs, or the locked-together train 140. When this stage has been reached, if endless belt-shaped traction means are employed, these are moved long enough so that no more spikes are in the area of the longitudinal folding hopper 18. When using a finite traction means, for example a draw-in chain or a toothed belt with spikes, whose guidance is provided underneath the hopper insertion plate 21, it is moved out of the area in which, at a later time, the paper webs, or the train 140, will move at higher speeds, so that the relevant area is "free of spikes". Another possibility would be to flip over, retract, or the like, the spikes 35 prior to their entry into the area of the hopper insertion plate 21, or other areas in which the train 140, or the paper webs, will move during production, so that they can no longer be pushed into the paper webs, or train, moving above them. It is also possible to lift the entire guide device off the hopper insertion plate in this way.

A selection of devices will be described in what follows, by which an interlocked connection of the individual paper webs to form a train is possible, wherein the interlocked connection by the preferred embodiments described in what follows should take place no later than in the area of the start of the hopper flanks 22, 23:

1. The traction means 33, 34, 124 in the form of belts, chains, cables or other designs in a finite or endless form have spikes 25 (FIGS. 5 to 12).

2. The individual paper webs 05, 06, 07, 137, 138, 127, 133, 134, 139 are connected with each other by staples in a longitudinal direction to form a train 140 (FIG. 19), i.e. locked together. For this purpose, an upper driven staple closing cylinder 199 with a staple closer 200, and a driven lower stapling cylinder 201 operating together with it, are provided in the area of the slide plate 11, but prior to the insertion roller 16. A wire feed 202 to the stapling cylinder 201 is provided on a cross bar fixed in place on the frame. A staple is formed by the cooperation between a staple forming disk 204 and the wire feed 202, which is taken along by the stapling cylinder 201. At the end, it penetrates the paper webs and is closed by the staple closer 200. In this way, the individual paper webs are locked together into a train 140. It is possible to provide several stapling devices 198 next to each other over the width of the paper web.

Figure 18:
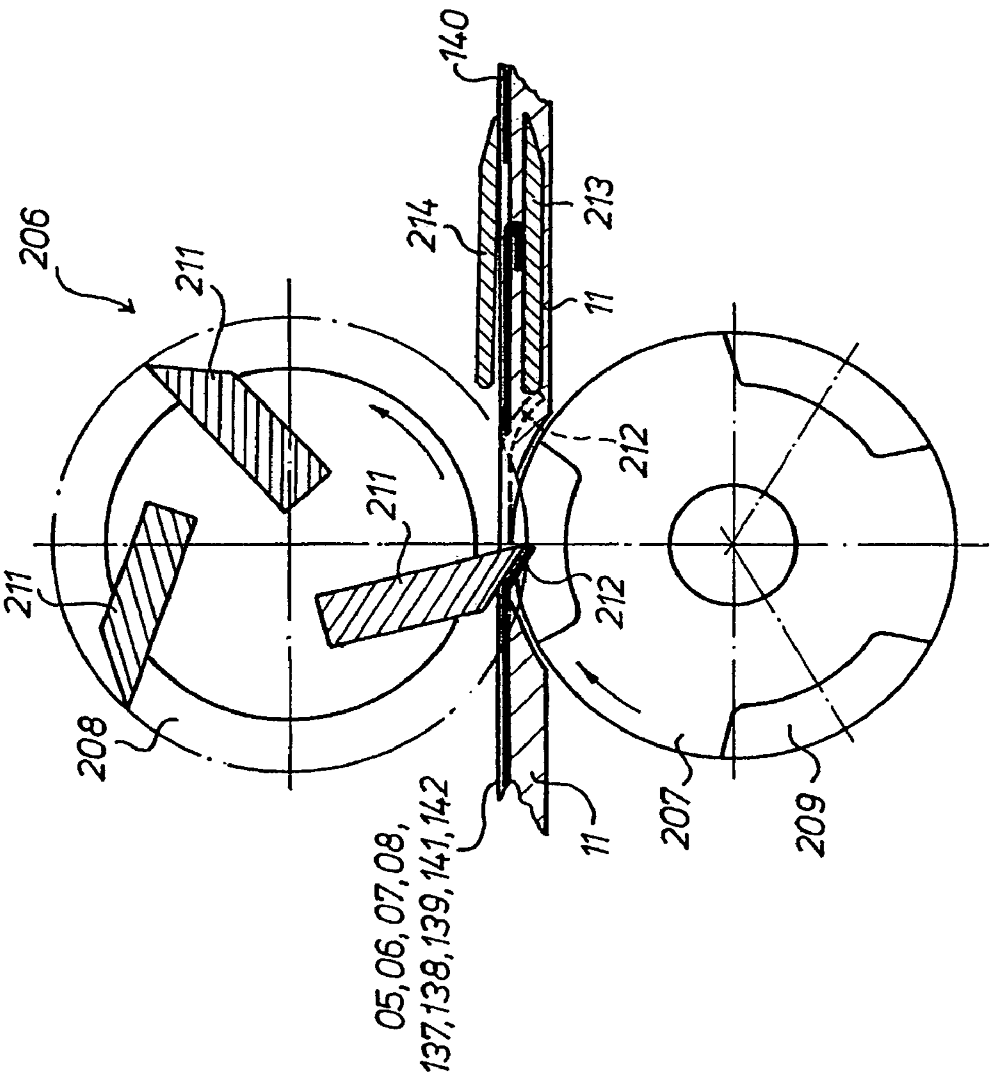
Figure 19:
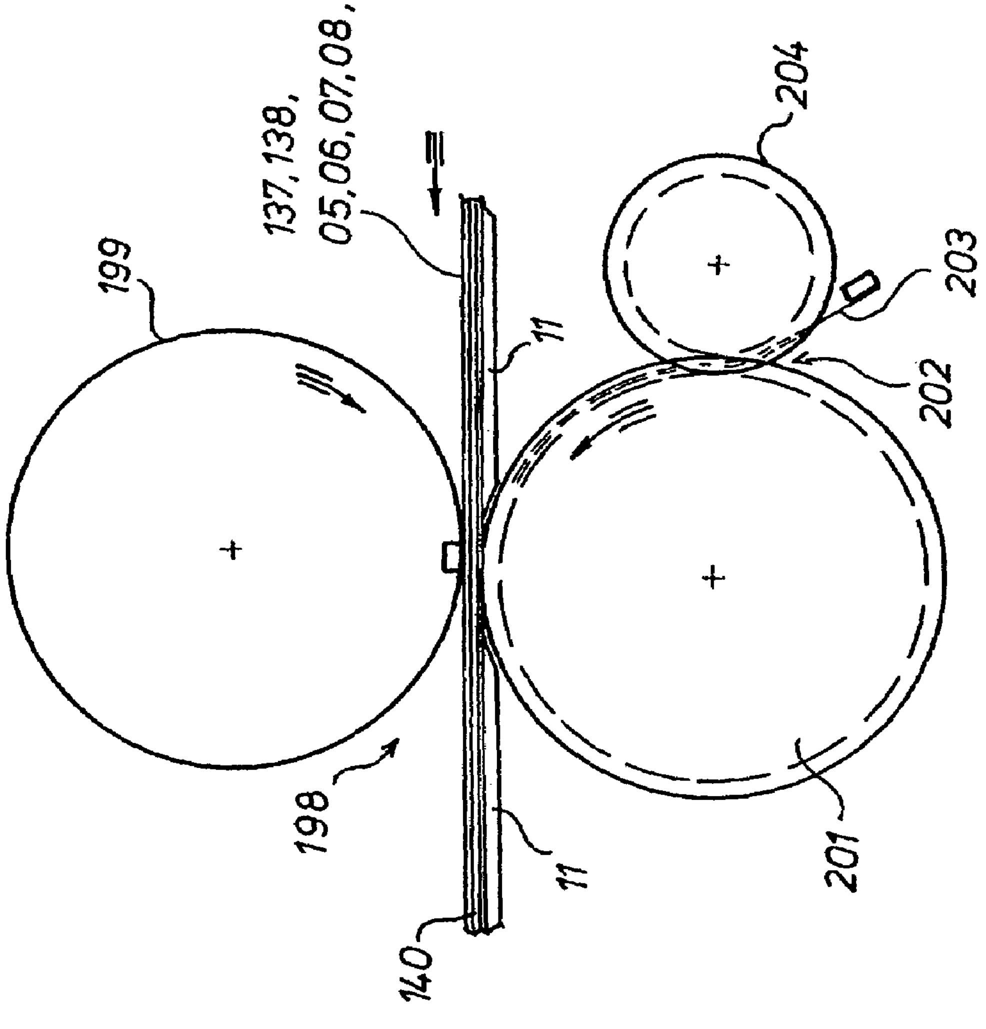

3. By use of so-called tongue-stitching (FIG. 18). One or several tongue-stitching devices 206 are provided for this purpose in the area of the slide plate 11. Essentially, this tongue-stitching device 206 consists of an upper driven stamping die cylinder 208 and a lower driven matrix cylinder 207 cooperating with it. The stamping die cylinder 208 has a plurality of stamping dies 211, which are fixed. The stamping dies 211 work together with matrix recesses in the matrix cylinder 207. A plurality of paper webs are fed to the tongue-stitching device 206. A mutual three-sided cut by use of the stamping dies 211 in cooperation with the matrix cutout 209 is performed in these paper webs placed on top of each other. The "tongues" 212 created in this way in the paper webs are free in the moving direction of the train or web, while they can be folded downward in their base portion. The tongues 212 are pushed into the matrix cutout 209 in such a way that they retain this fold at least so long, until they thereafter come between two spaced-apart plates, the guide plate 214 arranged above the paper webs and fixed in place on the frame, and the bending plate 213 arranged underneath the paper webs.

The punched-in tongues 212 are permanently bent around their base by approximately 180 between the bending plate 213 and the guide plate 214 and are hooked together in this way. This occurs in particular if the tongues have the shape of a clover leaf.

Figure 20:
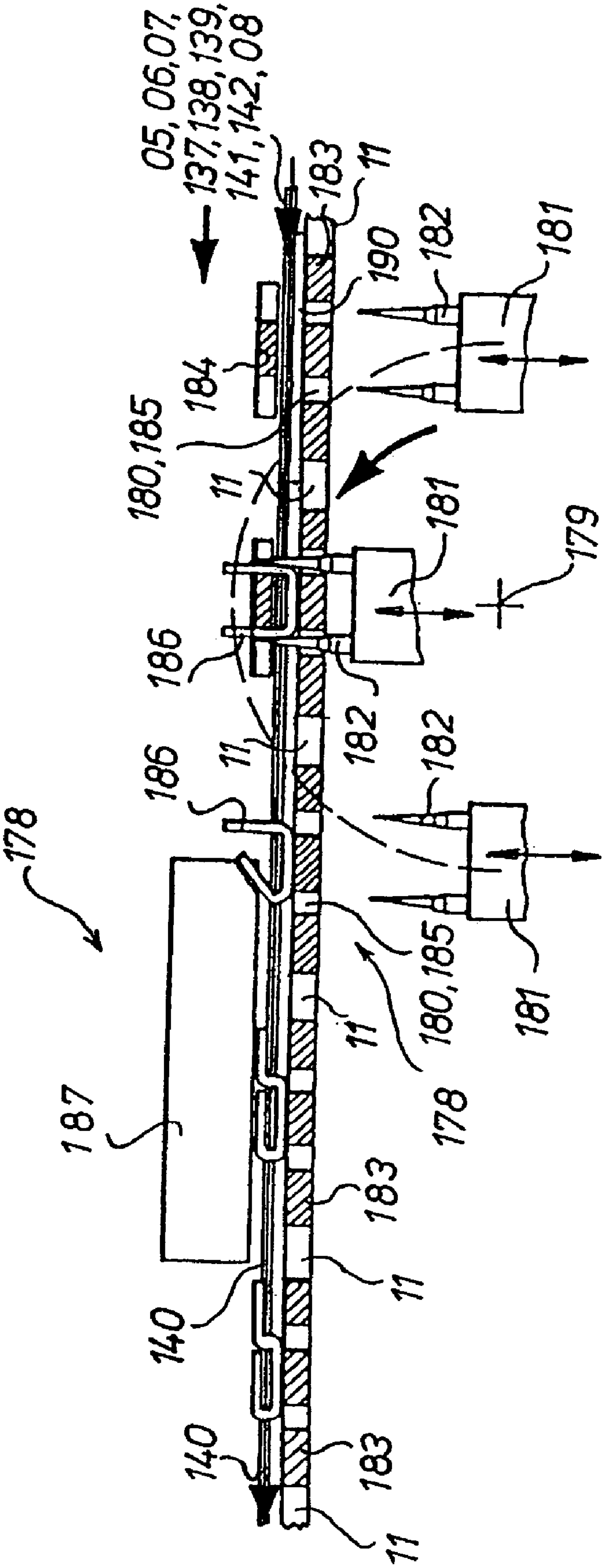

4. By, for example, thread-stitching (FIG. 20)

A thread-stitching device, for example a thread-sealing device 178 is arranged, for example, in the area of the slide plate 11 upstream of the insertion roller 16. The thread-sealing device 178, which is known per se, is arranged partly above and partly inside the slide plate 11. In the preferred embodiment, a needle drive 179 is arranged below the slide plate 11. The needle drive 179 takes place synchroneously with the speed of the incoming paper webs 05, 06, 07, 137, 138, 139, 141, 142, or of an incoming already put-together train 08. Such a device is described in DE 195 23 812 A1. A plurality of carriers 181 of pairs of needles, which can be lifted and lowered and respectively have two stitching needles 182, is attached to a rotating support. A plurality of lower holders 183, fixed in place on the frame, is provided at regular intervals in the slide plate 11 in an area, in which heat sealing is possible. Each of these holders 183 has bores 180, 185, whose distance from each other and whose diameters are matched to the stitching needles 182 of the needle carrier 181. Two counter-holders 184, fixed in place on the frame and arranged one behind the other in the running direction of the paper web, are provided at an appropriate spacing above the respective bores 180, 185 of the lower holders 183, fixed in place on the frame. The counter-holders 184, fixed in place on the frame, have cutouts on the left and the right, into which the left or the right stitching needle 182 can be moved. A heatable heat-sealing device 187 is provided, spaced apart in the running direction of the paper web, from the second counter-holder 184 at an appropriate distance from the slide plate 11, or the holder 183. In the course of the thread-sealing process, two stitching needles 182 push both ends of a piece of thread upward through the paper webs, so that a thread clip 186, which can be heat-sealed, is moved upright along with the web to the heat-sealing device 187. There, the leading leg of the thread clip 186, which can be heat-sealed, runs against an incline of the heat-sealing device, and the first leg is bent over opposite the running direction of the web. The trailing leg of the thread clip 186 follows it and is also bent over against the running direction in such a way that it comes to rest on the topmost paper web. The paper webs are locked together into a "locked-together train 140" by this process, which can be repeated at any arbitrary distances.

Further interlocking possibilities:

The above mentioned locking-together possibilities are only mentioned by way of examples. It is, of course, possible to employ other methods, for example the sewing together of individual paper webs for the purpose of locking the paper webs together to form a locked-together train 140. Such methods have become known, for example, in the course of sewing paper bags together.

In what follows, a selection of devices will be described, by which a connection of the material of the individual paper webs to form a locked-together train 140, for example, is possible:

1. By the application of a glue (for example a contact adhesive) (FIG. 14) to the paper webs 05, 142, 141, 139, 06, 07, 137, 138, an interlocking connection of the individual paper webs to form a locked-together train 140 is achieved. Here, a glue application, for example a glue track or a spray application of glue, is applied to the respective reverse sides of the paper webs by glue application devices 188, 189, 191, 192, 193, 194, 196, 197. The glue application is selected in such a way that during the subsequent bringing together of the paper webs under pressure, respectively one paper web is glued together with the one following next.

The individual paper webs are moved past the glue application devices 188, 189, 191, 192, 193, 194, 196, 197 by paper draw-in devices 127, 128, 129, 131, 132, 133, 134 and 136 and receive their application of glue before they are fed, via their respectively assigned upper insertion deflection rollers 143 with the associated paper guide rollers and/or the lower insertion deflection rollers 144 to a combining clamping device, consisting of two rollers, for example the rollers 03 and 04. The rollers 03 and 04 exert a pressure on the paper webs now lying on top of each other, so that they become a sufficiently locked-together train 140. The rollers 03, 04 are provided as driven rollers and, in addition to their function of pressing the paper webs on each other, they can be used as a transport function of the locked-together train 140 in the direction toward the insertion roller 16, and further via the longitudinal folding hopper 18 and finally into the hopper folding rollers 26, 27.

2. It is possible to use a connection of the material of the individual paper webs by beading (cold welding) (FIG. 15).

A device is represented in FIG. 15, which is suitable for connecting the material of respectively two paper webs to form a locked-together train 140. A driven lower anvil roller 161 is provided for this purpose, which is operated together with a driven hammer roller 162. The anvil roller 161 and the hammer roller 162 are arranged in such a way that they can be brought into contact with each other in a transverse slit of the slide plate 11. The anvil roller 161 has a hardened exterior and is smooth. The hammer roller 162 is relatively narrow and has a hardened beaded surface. It is driveably seated on a front striker bar 167 and a rear striker bar 168. The striker bars 167, 168 are seated in a guide 163 and can be raised and lowered. A controllable work cylinder 164 is used for this. By use of a pneumatic striker unit 164 (for example a pneumatic work cylinder), the hammer roller 162 is abruptly knocked against respectively two paper webs on the anvil roller 161. A force of 200 kiloponds per 50 mm of hammer roller width is achieved. The beads 169, as shown in cross section in FIG. 17, act on the two paper webs located between the anvil roller 161 and the hammer roller 162 in such a way that they are permanently connected with each other in the manner of cold-welding. This method of cold-welding two webs of material is employed, for example, when producing coffee filters. The drive mechanism of the hammer roller 162 is represented in FIG. 16.

A device will be described in what follows, by use of which it is possible to achieve the form-locking connection of the individual paper webs to form a locked-together train 140 (FIGS. 13, 14):

1. Paper webs 05, 142, 141, 08, 06, 07, 137 and 138 are drawn in over paper guide rollers (not represented), assigned to the upper and lower insertion deflection rollers 143, 144, respectively, by means of paper draw-in devices 127, 133, 134, 136, 128, 129, 131, 132, known per se, to which they are attached and which are guided over insertion deflection rollers 143, 144 especially assigned to them. The axes of rotation of the associated paper guide rollers and the insertion deflection rollers 143, 144 are congruent with each other. The paper webs are drawn in sufficiently far so that they are pulled through an insertion gap between two roller-shaped charge electrodes 145 and 150, which are arranged above each other, can be charged with a voltage, and are spaced apart from each other. Shortly after passing this insertion gap, the paper webs are released by the above mentioned paper draw-in devices respectively assigned to them. The individual paper web draw-in devices are deflected at approximately the height of the connecting line between both centers of rotation of the charge electrodes 145, 150 by use of deflection rollers respectively assigned to them. In this case, several, i.e. a number corresponding to the number of the paper draw-in devices, upper deflection rollers 146, or lower run-out deflection rollers 147 are provided.

Each of the charge electrodes 145 and 150 is driven synchroneously with the web draw-in speed (FIG. 14). They are electrically insulated against the lateral frames in which they are seated, and their distance from each other, which cannot be zero, can be adjusted. The roller-shaped charge electrode 145 has positive high-tension d.c. voltage, and the charge electrode 150 is charged with negative high-tension d.c. voltage, for example. The positive and the negative high-tension d.c. voltages are generated by a d.c. high-tension voltage generator 149. It has a positive high-tension connecting line 151 for the positive voltage and a negative high-tension connecting line 152 for the negative voltage. The connectors 151, 152 are connected with the connectors of the charge electrode (roller) 145, or charge electrode (roller) 150. By charging the two charge electrodes or rollers 145, 150 with a high-tension d.c. voltage, the paper webs, which are located under pressure in the insertion gap between these two rollers 145, 150, are "locked-together" electrostatically to form a train 140. The train 140 locked together in this way is conveyed from the rollers 145, 150, for example by driven rollers, which are seated, electrically insulated, in the lateral frames, to a combining roller 03 and the pressure roller 04 acting together with it, for example. These rollers 03, 04 compress the train 140 between each other. The rollers 03 and 04 can, of course, also be correspondingly connected to the high-tension d.c. voltage source 149. The conveying rollers 03, 04 with the locked-together train 140 pressed between them can push it via the folding hopper 18 into the rotating hopper folding rollers 26, 27. It is, however, also possible to additionally employ traction means 33, 34, 17, 87, 144 with the spikes 35 for transporting the electrostatically locked-together train 140. It is also possible to provide driven incised pressure rollers 59, 60 for pressing the train 140 down—as represented in FIG. 2 in connection with the endless traction means. Prior to or after electrostatic locking together, they push the locked-together train 140 into the spikes 35 of a finite or endless traction means—for example a chain as represented in FIGS. 11, 8, 9 and 10—which retain it in this way.

All elements of the longitudinal folding apparatus, such as the insertion roller 16, the hopper insertion plate 21, the hopper projection 24, the driven hopper folding roller 26, 27, as well as the two hopper flank plates 55 and 65, and also the lateral guide devices 61 and 62, arranged spaced apart from the hopper flank plates 55 or 65, etc., are seated, electrically insulated from the metallic lateral frames 117, 118 of the folding apparatus 116.

As already stated, the longitudinal folding hopper 18 can be equipped with a hopper insertion device 273 with guide devices 61, 62, and hopper flank plates 55, 65 cooperating with them, a hopper cover plate 274, etc. When using an electrostatically locked-together method, they are all appropriately connected with the d.c. high-tension source 149. It is obvious here that the charges of the guide devices 61, 62 and the hopper flank plates 55, 65 are appropriately matched to the charges of the uppermost, or lowermost paper web of the locked-together train 140 in order not to generate counterproductive effects.

As was described above, several paper webs can be "locked together", at least temporarily, to form a train 140 by frictional, material or interlocking connection. The minimum demands made on such a "locking-together" is that the paper webs resting on top of each other are kept together in such a way that their ordered placement on top of each other is not removed for a sufficient amount of time, or that they cannot move far apart so far that the frictional, material or interlocking connection between them fails. Thus, it is desired that the paper webs resting on each other can only move together in the running direction of the paper webs. This mutual movement in the direction of the paper web can be caused—as explained—by use of traction means having spikes 35 and moving into the longitudinal folding hopper 18. For example, it is possible to arrange the traction means in such a way that their spikes 35 project at times out of a longitudinal slit 98 along the folding hopper insertion plate 21 into the path of movement of the paper webs, or of the locked-together train 140.

The paper webs, which are connected with each other by a frictional, material or interlocking connection (locked together), or the train 140, threaded on the spikes 35 are conveyed in this way in the direction toward the rotating hopper folding rollers 26, 27 until they are finally grasped by them or, "threaded" on the spikes 35 of the traction means, they are further conveyed by them through the gap between the two hopper folding rollers 26, 27. With the hopper folding rollers 26, 27 spaced far apart (i.e. with a large gap between them), the hopper folding rollers 26, 27 need not necessarily rotate during the draw-in process. This is one option for moving the paper webs, or the train 140.

It is, of course, necessary to see to it that, as soon as the draw-in process is completed, the spikes 35 have left the movement path of the train 140 over the hopper insertion plate 21.

A further option lies, for example, in providing driven transport rollers 03, 04 upstream of the longitudinal folding hopper 18, between which the paper web, or paper webs, or the locked-together train 140, —regardless of the method— are compressed. Using a force-locking connection, i.e. frictional connection, the paper webs, or the train 140, are pushed in the direction toward the longitudinal folding hopper 18 until at the end they come, via the hopper insertion plate 21, between the rotating hopper folding rollers 26, 27. The latter grasp them and then see to continued conveyance of the paper web/webs, or the train 140. From the rotating hopper folding rollers 26, 27, the paper web/webs, or the train 140, finally arrive in the folding apparatus 116 which, for example, has the cutting rollers and finally the transverse folding cylinder group, as well as possibly downstream connected longitudinal folding device.

To return again to the hopper insertion device 273 (FIG. 13):

Its guide devices 61, 62 not only cover the hopper flank plates 55, 65, but preferably also the hopper insertion plate 21 at a defined width at the top and sides and at a sufficient distance so as not to interfere with the possible movement of the train 140, or of the paper webs. Within the scope of this description, these covering elements are called upper right cover plate 165, or upper left cover plate 155 and are represented in this way (FIG. 13). The cover plates 155, 165 preferably start over the insertion roller 16 and are slightly upwardly offset, so that a sort of insertion hopper for the incoming paper webs, or train 140, is respectively formed. The paper web, or webs, or the train 140, reach the inlet area of the cover plates 155, 156 by being pushed or pulled. Their inner distance over the hopper plate width has been selected in such a way that it is sufficiently greater than the width of the paper webs which must be maximally processed, plus any possible lateral deviation (plus/minus 10 cm) to the left or right from their ideal run-in path. Finally, the paper webs, or the trains 140, arrive in the area of the cover plates 155, 165. Since, corresponding to the geometric shape of the longitudinal folding hopper 18, the entire paper guide device 61, 62 tapers in the direction toward the hopper insertion rollers 26, 27, in the end the sides of the paper web/webs, or the train 140, laterally push against the guide device 61, 62 on the inside. Because the upper cover plates 155, 165 prevent the paper web/webs, or the train 140, from yielding toward the top, they are deflected over the hopper flanks 22, 23 of the longitudinal folding hopper 18 and finally reach the space between the respective guide devices 61, 62 and the inner hopper flank plates 55, 65. The paper web/webs, or the train 140, cross this space until, at the end, their start reaches the insertion gap of the rotating hopper folding rollers 26, 27 and is grasped and conveyed on by them.

Preferred embodiments of the arrangement of the guide devices for the traction means with spikes will be described in what follows (FIG. 21, FIG. 22), by use of which it is possible to pull or push a paper web/webs, or a locked-together train 140, threaded on spikes 35, over the longitudinal folding hopper 18, with our without a hopper insertion device 273, until in the end it reaches the insertion gap between the driven hopper folding rollers 26, 27 and is grasped and conveyed on by the hopper folding rollers 26, 27. The traction means employed for this can be in the form of belts, chains, cables or toothed belts.

One option is, for example, to fasten the guide devices on the underside of the hopper insertion plates 21 and to let the spikes 35 project through a longitudinal slit 98, 99 upward into the movement path of the paper web, or the trains 140, on the hopper insertion plate 21 (FIG. 22). In this case, the guide device is endless, i.e. the traction means can be moved around in it.

Figure 21:
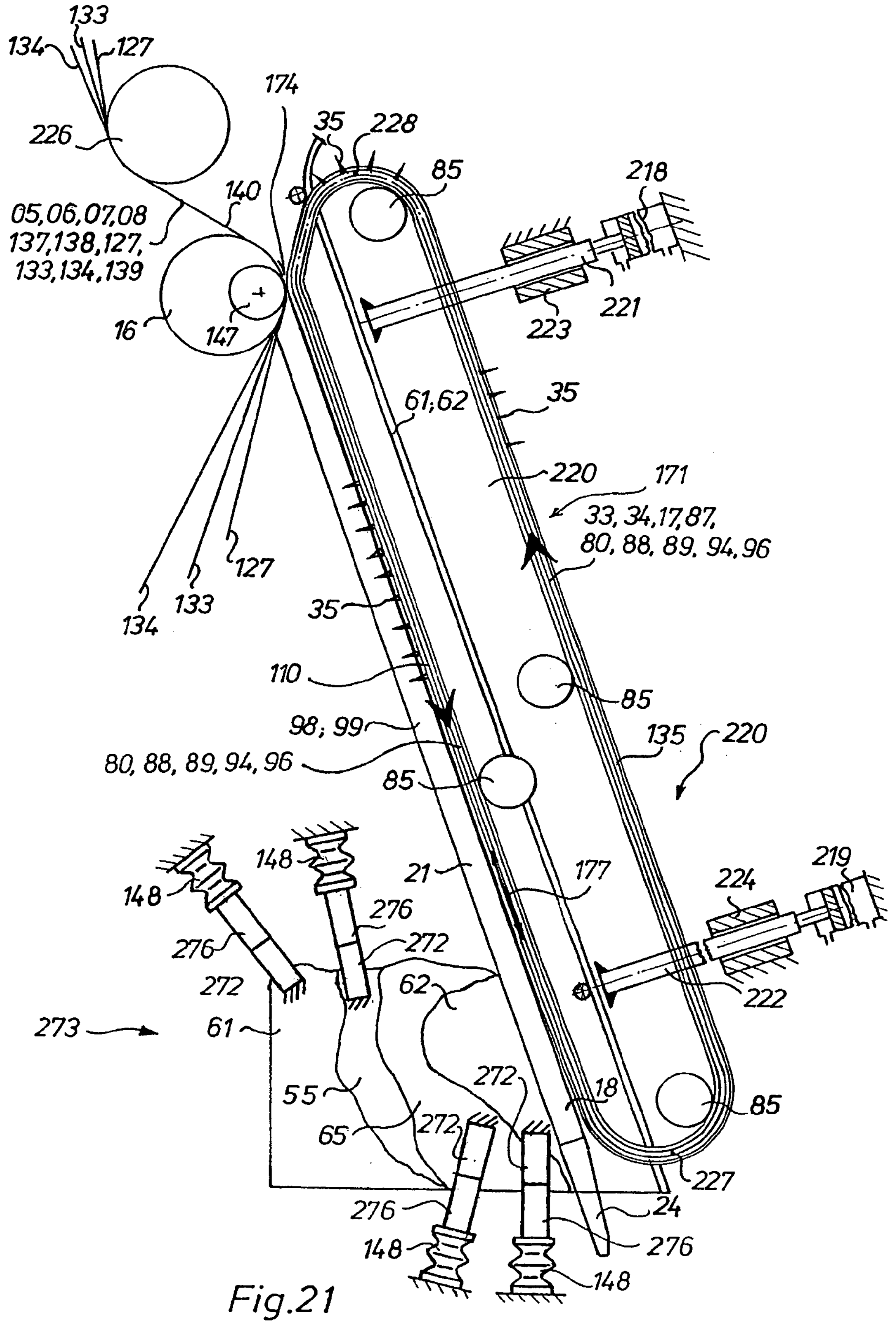

The other option is to arrange an endless guide device for the just mentioned types of traction means above the hopper insertion plate 21 and to move the traction means in such a way that their spikes 35 are moved while projecting from above the hopper insertion plate into the longitudinal slit 98, 99 and are moved in it into the vicinity of the hopper projection 24 and then moved away in an upward direction (FIG. 21).

Thus, the spikes 35 of the traction means enter a gap, or groove in the hopper insertion plate 21 from above (FIG. 21). A guide rail support 220, for example made from an aluminum sheet, is provided for this. The guide rail support 220 extends, for example, along the center line of the longitudinal folding hopper 18 at right angles to the hopper insertion plate 21. A guide element 80, in the form of a profiled strip 89 as the guide 80 for the traction means, is arranged over the entire circumference of the narrow side of the guide rail support 220. The individual profiled strips, or guides 80 are arranged in such a way that an all-around path (movement path) along the circumference of the guide rail support results. The guide 80 can be designed in the way illustrated in FIG. 11. In this case, a roller chain 87, as represented in FIGS. 8, 9, 10 and 11, is particularly suitable as the traction means. However, a toothed belt would also be suitable as the traction means. The traction means, consisting, for example of a toothed belt or a draw-in roller chain 87, can be endless or finite. When using a traction means of finite length, it is a few centimeters (for example 5 cm) shorter than the length of the path in the longitudinal groove 94 of the guide device.

A plurality of rpm- and position-controlled electric motors 85, which run synchronously with each other, is provided as the drive mechanism of the draw-in means, and engage the chain links, or the teeth of the toothed belt, by means of their pinion teeth. The drive mechanisms, are of course, also synchronized with the paper web speed with which the paper webs, or the locked-together train 140, are to be transported over the hopper insertion plate 21 during the draw-in process. The spikes 35 of the traction means are oriented in such a way that in the area of the hopper insertion plate 21 they point in the direction of the latter and project out of the guide 80, 89. During the draw-in process, the drive motors 85 continuously drive the draw-in means with its spikes 35, so that spikes 35 move continuously from the start of the longitudinal folding hopper 21 practically to its end in the vicinity or inside the area of the hopper projection 24.

The guide rail support 220, with its guide 80, 89 and the traction means, can be placed against and away from the hopper insertion plate 21 by suitable means, for example by a rocker, fixed on the frame, or by retractable and extensible guide rods 221, 222, one end of which is fastened on the guide rail support 220. Each of the guide rods 221, 222 is guided in guide blocks 223, or 224, fixed in place on the frame. The second ends of the guide rods 221 and 222 are each connected with piston rods of actuation means 218, 219. Pneumatic or hydraulic two-way valves can be provided as the actuation means, for example. Different possibilities for drive mechanisms are of course also conceivable, for example an electric motor drive by toothed racks.

The contact pressure which the guide rail support 220 exerts via the guide 80, 89 on the hopper insertion plate 21, and therefore on the paper webs, or the locked-together train 140, moving on it, can be continuously adjusted by the adjustable pressure of the fluid. Prior to and during the draw-in process of the paper webs, or of the train 140, over the hopper insertion plate 21, the guide rail support 220, and therefore the guide 80, 89, can be brought into a predeterminable distance from the hopper insertion plate 21. For this purpose, the guide rail support 220 can be moved toward and away from the hopper insertion plate 21. Because of this, it is selectively possible to let the spikes 35 of the moving draw-in means enter the paper web, or the locked-together train 140, continuously, or not, and to move it in this way in an interlocked manner in the direction toward the hopper projection 24, or not. Once arrived there, the spikes 35 respectively leave the paper web, or the train 140, in an upward direction because the direction of movement of the spikes extends in a different direction than that of the paper web, or the train 140. Strippers prevent the paper web, or the train 140, from being taken along in the reverse-running movement path of the moved traction means with the spikes 35. In order to be used as strippers, the two cover plates 155, 165, for example, could be moved so close together in the vicinity of the exit point of the spikes 35 out of the paper webs, or the locked-together train 140 (for example in the vicinity of the wide end of the hopper projection 24), that an excessive lifting of the paper webs, or of the train 140, perpendicularly in respect to the hopper insertion plate 21 would no longer be possible.

The first meeting of the spikes 35 with the paper web, or the train 140, to be drawn in can, for example, take place on the insertion roller 16 (FIG. 21). A ring-shaped recess 101, as seen in FIG. 33 is provided for this in the insertion roller 16 along the movement path of the spikes 35 through the surface of the latter.

To prevent the downward yielding of the traction means, for example the roller chain, during the threading process, a support block 120, which itself is supported on the guide 80, 89, is provided in the area of the first meeting of the tips of the spikes 35 with the paper webs, or the train 140, in the guide rail, as represented in FIG. 11, for all chain- or toothed belt-like traction means described in the specification. It is thus prevented that an excessive lateral tilting movement of the traction means, for example the roller chain 87, takes place in the critical moment of entering the paper webs, or the train 140.

At the termination of the draw-in process, the actuating means 218, 219 are acted upon by an appropriate electrical control device in such a way that the guide rail support 220 is brought to a distance sufficiently far away from the hopper insertion plate 21 that it is assured that there is no longer a possibility of the spikes 35 coming into contact with the paper webs, or the train 140.

In connection with longitudinal folding hoppers 18 where spikes 35 piercing the paper webs, or the locked-together train 140, from above are not desired or possible (FIG. 22), an arrangement 171, 225 is provided which makes it possible that the spikes 35 pierce the paper webs, or the locked-together train 140, being guided over the hopper insertion plate 21 from below (FIGS. 22, 24). These arrangements 171, 225 basically consist of an "endless path" 94, 102 in guides 80, 88, 89, which makes it possible for a traction means 33, 34, 124 with spikes 35, for example in the form of a roller chain 87 or a toothed belt, to be moved "all around" in this guide 80, 88, 89, so that spikes 35 are continuously brought into the movement path of the paper webs, or the train 140, on the hopper insertion plate 21, which then pierce (thread) the paper webs, or the train 140, and hold them/it in this way in an interlocked connection until they dive away again. The traction means 33, 34, 124 with the spikes 35 can be designed to be endless or finite. A plurality of, for example electric, motor drive mechanisms 85 is provided along the entire movement path of the traction means for moving it. These consist, for example, of respective motors 205 with an over-mounted pinion 210, or chain wheel. When using a roller chain 87, for example, it runs up on the chain wheel 210 in just such a way that its teeth enter between respectively two rollers. With traction means 33, 34, 87 of finite length, the distance between respectively two drive mechanisms 85, which are arranged directly next to each other and act on the traction means, is shorter, viewed along the movement path, than the length of the traction means.

When using a finite traction means, for example a roller chain 87 or toothed belt, the length of the traction means will preferably be almost just as long (for example 5 cm or less) as the length of the closed endless movement path, i.e. of the work path 110 (FIG. 22), or of the work path 110 plus the storage path 115 (FIG. 24). It is achieved by this that, if it is so desired, spikes always extend out of the hopper insertion plate 21 in spite of the finite traction means, and the paper webs, or the train 140, being fed to the longitudinal folding hopper 18 can be continuously threaded on spikes 35. When the draw-in process is now terminated, it is assured that no more spikes 35 are present in the portion of the work path 110 which constitutes the movement path of the paper webs, or of the train 140, along the hopper insertion plate 21. To achieve this, the traction means 33, 34, 124 of finite length, with the spikes 35, for example, is wholly or partially removed from the work path 110, in which the traction means moves during the draw-in process, and is moved to a storage path 115 (FIG. 22).

In the preferred embodiment in accordance with FIG. 22, the paths 110, 115, 135, 230 each extend in guides 80, 89 in the form of profiled strips 88, fixed in place on the frame, or in their interior, which are represented by way of example in FIGS. 11 and 12.

The direction of movement of the traction means 33, 34, 124 in its guide 80, 88, 89 takes place on its side facing the hopper insertion plate 21 in the production direction. The work path 110 makes a reversal in the direction toward the hopper interior in the vicinity of the hopper projection 24. A guide arc 227 (FIG. 22, FIG. 24) near the hopper projection is used for this. From there, the return movement path of the work path 110 runs straight ahead for a distance until it undergoes a deflection around a guide arc 228 remote from the hopper projection and terminates in the forward movement path of the work path 110 along the hopper insertion plate 21 (FIG. 22, FIG. 24). In the preferred embodiment of FIG. 22, the return movement path 135 of the work path 110 on its course from the guide arc 227 near the hopper projection to the start of the guide arc 228 remote from the hopper projection coincides with the forward movement path 230 of a storage path 115, for example.

The forward movement path 230 of the storage path 115 leaves the common path in the vicinity of the arc 228 remote from the hopper projection and leads, via an upper arc 229 of the storage path, into a straight section, the return movement path 235 of the storage path 115, 135, 230. The end of the return movement path 235 terminates at a lower arc 231. The latter is connected to the common path 115, 135, 230 by a lower, remotely controllable shunt 105. A remotely controllable upper shunt 100 is arranged in the upper area of the common path 115, 135, 230. Its job is to deflect a finite traction means selectively out of the common path 115, 135, 230 to the right into the work path 110, or to the left into the storage path 115 (FIG. 22).

The switchable upper shunt 100 has the task of inserting the traction means with its spikes 35 from the return movement path 135 of the work path 110, 135, 230 into the remaining portion of the storage path 115. During this insertion process, the shunt 100 is switched in such a way that it assuredly prevents a deflection of the arriving start of the traction means into the arc 228 remote from the hopper projection of the work path 110. Thus, the storage path 115 now extends, viewed from this shunt 100, in a guide, which extends from the shunt 100 over an upper arc 229 and a straight section to a lower arc 231. From the lower arc 231 through the electrically remotely controllable shunt 105—which either opens or blocks the path—into the common path 115, 135, 230, the lower shunt 105 blocks the way, therefore the traction means cannot get from the path 115 into the common partial path 240 of the paths 115, 135, 230.

On the other hand, with only the storage path 115 blocked by the lower shunt 105, the traction means can enter from the return movement path 135 of the forward movement path 110 into the common partial path 240 of the work path 110. The length of the storage path 115, including the common partial path 240, is slightly greater than the total length of the traction means.

A plurality of traction means drive mechanisms 85 are provided along the partial path 240—which, with the appropriate shunt position, is a forward moving part of the storage path 115—(FIG. 22, FIG. 23).

A further arrangement 171 for transporting paper webs placed on top of each other, or a "locked-together" train 140, over the slide face 41 of the hopper insertion plate 21 and, if required, over the left or right hopper flank plate 55, 65 of the longitudinal folding hopper 18 is represented in FIG. 24 and will be briefly described in what follows.

The guide rail support 225 with the guide 88, 89, already described above, and with the traction means 33, 34, 124, which may be either finite or endless is provided. It is arranged underneath the hopper insertion plate 21. The guide 88, 89 is embodied to be endless, i.e. an all around movement of the traction means 33, 34, 124 along the contours of the guide rail support 225 is possible. The guide rail support 225 can be moved toward and away from the hopper insertion plate 21 from below. In the preferred embodiment, two linear guides, each consisting of respective guide rods 221, 222 fastened on the guide rail support 225, guide blocks 223, 224, each fixed in place on the hopper, and actuating means 218, 219, for example two-way valves, whose piston rods are interlockingly connected with the associated guide rod 22, are provided.

A plurality of traction means drive mechanisms 85, for moving the traction means 33, 34, 124, are provided on the guide rail support 225, whose drive wheels 210 act from below, for example interlockingly, on the traction means 33, 34, 124 and move them.

The hopper insertion plate 21 has a longitudinal slit 98, 99 per arrangement 171 for transporting paper webs placed on top of each other, or a locked-together train 140.

Longitudinal slit 98, 99 is slightly longer than the upper straight portion 172 of the guide 88, 89, which is located directly opposite the underside of the hopper insertion plate 21. For example, in that case its width is slightly greater (for example 3 mm) than the width of the straight portion 172 of the guide 88, 89 if it is intended to move the guide 88, 89 respectively in, or even through the longitudinal slit 88, 89.

If only spikes 35 need to be moved through the longitudinal slit 98, 99, the longitudinal slit 98, 99 can, of course, also be narrower (approximately 5 mm wider than the diameter of the spikes 35).

The guide rail support 226 in its entire length can be moved by an appropriate action of the actuating means 218, 219 out of a rest position remote from the longitudinal hopper into a work position close to the longitudinal hopper and maintained there, or vice versa.

In the position of rest, the guide rail support 225 is so far removed from the underside of the hopper insertion plate 21 that the outermost ends of the tips of the upright standing spikes 35 respectively terminate at least in the interior of the longitudinal slits 98, 99. Because of this, the slide face 41, or other faces at which the arrangement 171 is provided, is free of the sharp tips of the spikes 35. The paper webs, or the locked together train 140, therefore cannot become damaged, although the traction means 33, 34, 124 can be moved in the longitudinal slit 98, 99 with the spikes 35 upright.

When the guide rail support 225 is in its "work position", the spikes 35 project with the maximally greatest "work length" out of the longitudinal slit 98, 99 and can thread paper webs, which are fed in on top of each other, or a locked-together train 140.

Threading is made easier by means of a pressure device 173 with driven pressure rollers 59, 60 which can be raised and lowered and have a recess 63 all around (FIG. 7, FIG. 23). In the work position, pressure devices 173 are moved against the slide plate 11, or the slide face 41 of the hopper insertion plate 21 in such a way that they just do not touch the plates 11, or 21, for example are at a distance of 1 mm.

The pressure device 173 should be provided at a short distance from the point of exit 174, starting at which the respective spikes 35 on their path project out of the longitudinal slit 98, 99 at the maximally possible "threading length". The pressure rollers 59, 60 push the arriving paper webs, or the train 140, sufficiently far onto the spikes 35 until they have passed the element 68 on them which prevents the "threaded" paper webs, or the train 140, from easily being lifted off the spikes 35.

The paper webs, or the train 140, are moved by the traction means 33, 34, 124 in this interlocked state in the direction toward the hopper folding rollers 26, 27.

However, the just described arrangement 171 in accordance with FIG. 24 can also be operated with traction means 33, 34, 124 which do not have spikes 35.

In this case, the traction means 33, 34, 124 preferably have a blunt or structured transport surface 176 facing the paper webs, or the train 140. Surface 176 can be finite or endless and can consist of a toothed belt, belt or V-belt. The transport surface 176 should have a coefficient of friction as high as possible with respect to paper. For driving the traction means 33, 34, 124, at least one, and however preferably a plurality of traction means drive mechanisms 85 are provided on the guide rail support 225 (FIG. 23, lower portion), whose drive wheels are respectively simultaneously used as abutments for the pressure device(s) 173, which is/are arranged so they can be placed against or moved away from the traction means 33, 34, 124 (FIG. 2, FIG. 23, upper portion).

In its work position, the guide rail support 225 has been moved in the direction toward the plate 21, or 11, sufficiently far so that the spike-less traction means 33, 34, 124—viewed perpendicularly in respect to its longitudinal axis 177—projects upwardly from the longitudinal slit 98, 99.

The arrangement 171 can be adjusted in such a way that the traction means 33, 34, 124 project with a fraction of, or with its entire thickness upwards out of the longitudinal slit 98, 99 (FIG. 23, lower portion).

A pressure device 173, which, for example rotates, presses with a presettable force from above—at least in the area of the highest point of the drive wheels 37, 38, 210—against the upper structured surface 176 of the traction means 33, 34, 124. Rotatable, for example mechanically driven, pressure rollers 59, 60 with or without a recess 63 all around are particularly suited as the pressure device 173.

If now the paper webs or a train 140 come between the pressure element 59, 60 and moving traction means 33, 34, 124 (FIG. 23), the paper webs, or the train 140, are/is clamped between them by a force-locked (frictional) contact and, if required, with the interposition of one or several pressure device(s) 173, pushed at least into the "grasping area" of the hopper folding rollers 26, 27.

In the described preferred embodiments of FIGS. 21 and 24, the traction means 33, 34, 124 with the raised spikes 35 are fastened on the guide rail support 225, which are arranged so they can be moved back and forth in straight guide devices 223, 224, for example. However, other drive mechanisms would also be possible for moving the guide rail support(s) 225 toward the hopper insertion plate 21, or the slide plate 11, or away from it. For example, seating of the guide rail support 225 at the hopper, or the frame, would be possible by means of seated rockers.

Figure 25:
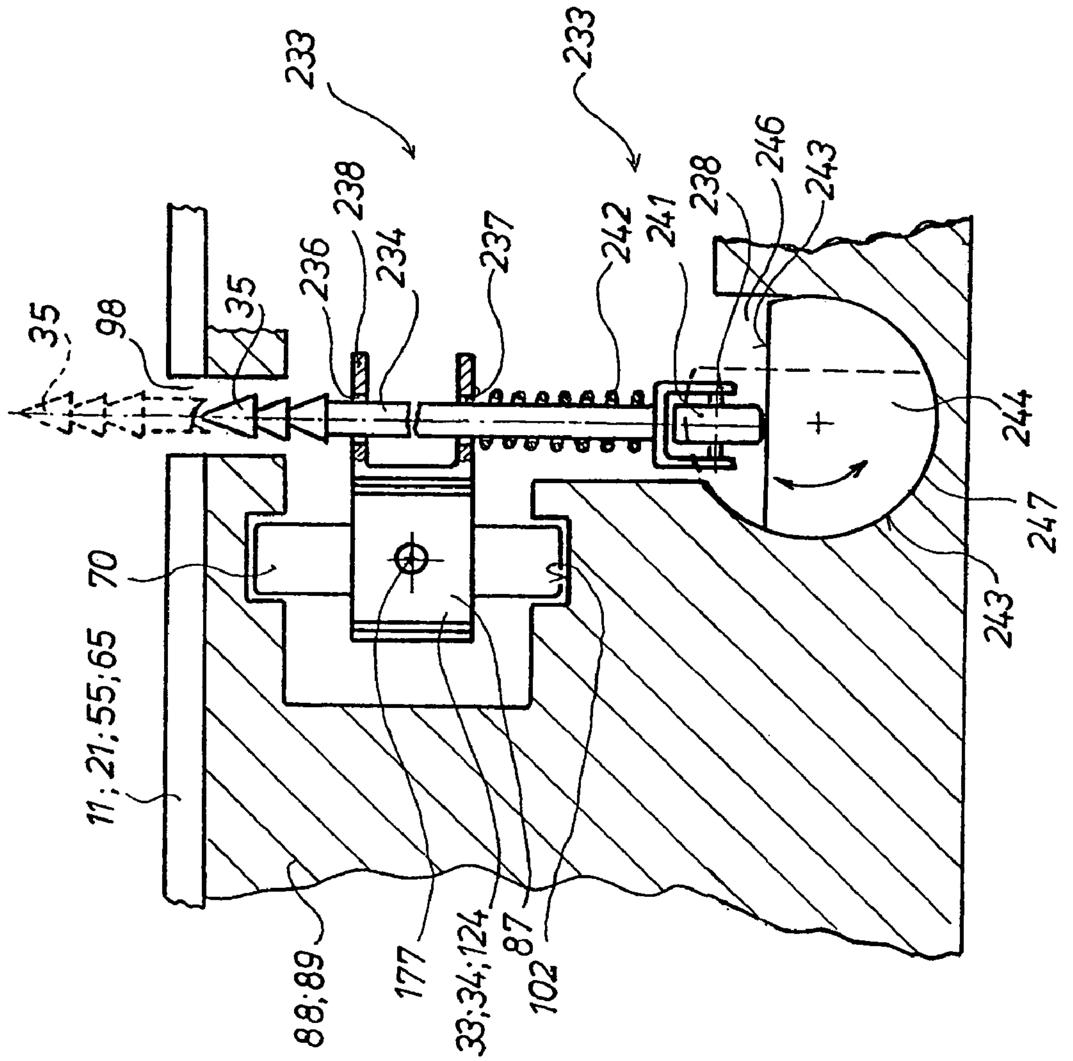

An arrangement can also be used in which the guide rail supports 225 are not movably arranged. In this case it is necessary to predetermine that the ends of the spikes 35 cannot enter into the movement path of the paper webs placed on each other, or of the locked-together train 140. The following solutions are proposed for this, for example:

a) the spikes 35, which are directly or indirectly fastened on the traction means 33, 34, 124, are arranged so they can be raised and lowered, as is depicted in FIG. 25, b) the spikes 35, which are directly or indirectly fastened on the traction means 33, 34, 124, are themselves arranged so they can be raised and lowered in respect to the traction means. The spikes 35 can be arranged so that in respect to the traction means movement direction, or the traction means longitudinal axis 117 of the traction means supporting them, they can be moved vertically or obliquely upward or downward, and also to the right or left (laterally), for example also bendably. In particular, it is also possible to arrange the spikes 35, or portions of the spikes 35, on the traction means 33, 34, 124 so they are pivotable and or tiltable or bendable in and/or opposite the traction means movement direction.

By use of the steps described under a) and b), it will be achieved that the ends of the spikes 35 preselectably project or do not project into the movement path of the paper webs, or of the train 140.

An example of an arrangement 233 for the lifting and lowering of spikes 35 fastened on the traction means 33, 34, 124 is represented in FIG. 25. In this example, the finite or endless traction means 33, 34, 124 is embodied as a roller chain 87, for example. It is represented and described in FIGS. 8, 9, 10, 11 and 12, for example. However, in contrast to the arrangement of the spikes 35 on the traction means 33, 34, 124 in a non-movable way described there, in this preferred embodiment shown in FIG. 25, spikes 35 are arranged so they can be lifted and lowered—preferably perpendicularly in respect to the longitudinal axis 177. Here, a smooth shaft 234 of each spike 35 is movably seated in bores 236, 237 of a U-shaped holder 238. A bearing 239, for example U-shaped, for a rotating roller 241 is fastened, fixed against relative rotation, at the lower end of the shaft 234. A spring 242, for example a compression spring, is clamped onto the shaft 234 between the lower leg of the holder 238 and the bearing 239. Spring 242 has the task of pushing the drive mechanism 214 of the spikes 35, for example the roller 241, against a control face 243 of a cam support, if no restricted guidance, by use of an interlock of the rollers 241, is provided.

In the preferred embodiment in accordance with FIG. 25, the cam support consists of a spindle 244, which can be pivoted around its longitudinal axis. Its cross section is in the form of a section of a circle (segment). The surface extending along the chord and length of the spindle 244 (surface over the chord 246), as well as the surface consisting of the arc of the section of the circle and the length of the spindle 244 (surface over the arc 247), are used as control faces. If the control roller 241 runs over a low control radius, i.e. on the "surface over the chord" 246, the spikes 35 are each pulled back by the force of their compression spring 242 sufficiently far that none of the spikes 35 projects out of the longitudinal slit 98, as depicted in FIG. 25.

If the spindle 244 is rotated in a clockwise or counter-clockwise direction, the control rollers 241 run on the "surface over the arc" 247, i.e. on the large control radius. This has the result that the spikes project at their full work length out of the longitudinal slit 98.

It is also possible to provide rails which can be lifted/lowered and have control faces 243 in place of the spindles 244.

As already briefly mentioned above under a), there are further options for not letting the tips of the spikes 35 temporarily extend into the movement path of the paper webs, or the train 140, along a plate 11, 21, 55, 65.

A possibility of this is represented in FIGS. 26 to 32.

In this case, the spikes 35 are arranged so they can be tilted (pivoted) in the direction of the longitudinal axis 177 of the traction means 33, 34, 124, 87.

A roller chain 87 is used as the traction means 33, 34, 124. A hinge 254 with a mobility f=1 is provided on a lateral face of the support elbow 86 pointing into the direction of movement of the traction means, for example a roller chain 87, and is fastened, fixed against relative rotation, on the fork 73. A two-armed pivot lever 248 is seated with restricted pivotability on the hinge. A first (right) lever arm 249 and a second (left) lever arm 251 of the pivot lever 248 respectively terminate in a first arresting spring 252 and in a second arresting spring 253, each bent downward in an S-shape. An arresting pin 256, which is overmounted on a bracket 90 of the fork 73, is provided in the pivot range of the pivot lever 248. Its task is to fix the end setting of the pivoting of the spikes 35 in the transport direction and to simultaneously serve as a suspension pin for the right (first) arresting spring 252 (FIG. 28, FIG. 29).

The left (second) arresting spring 253 only becomes effective with the spikes 35 completely raised. In this case, the left (second) lever arm 251 rests on the support elbow 86, and at the same time the left (second) arresting spring 253 extends around the lateral face of the support elbow 86 pointing opposite the movement direction of the traction means (roller chain 87). Because of this, the spikes 35, which are supported on the support elbow 85, are maintained in the upright position and cannot tip over opposite to the draw-in direction 255 of the traction means (roller chain 87) in the work path 110 (FIG. 26, FIG. 27).

Figure 27:
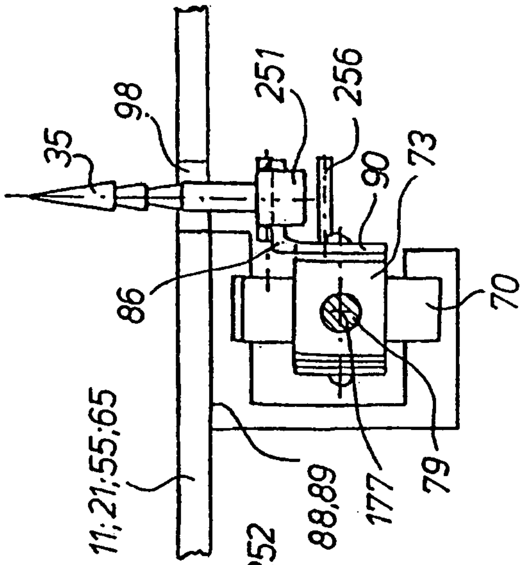
Figure 26:
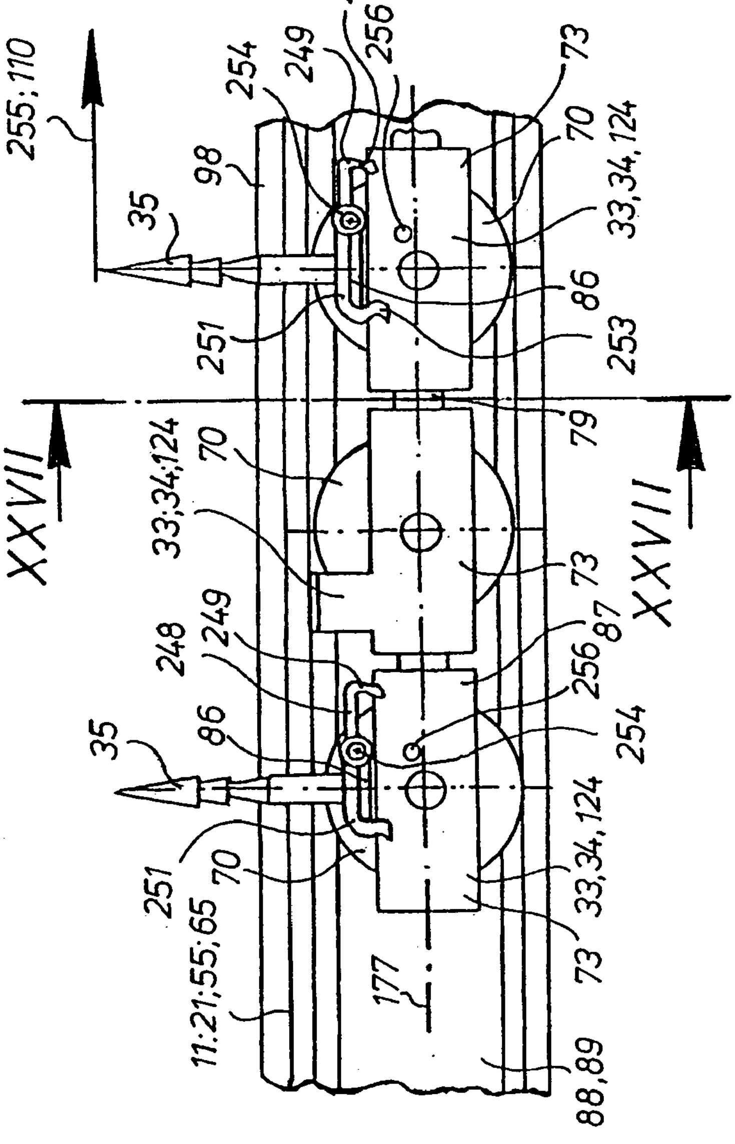

The movement of the traction means 33, 34, 124, for example a roller chain 87 with the upright extending spikes 35 in the draw-in direction or the forward moving direction 255 along the work path 110 is represented in FIGS. 26 and 27. During the draw-in process, the spikes 35 project through the longitudinal slit 98 of the plate 11 or 21 into the path of movement of the paper webs, or of the train 140, to be transported. A portion of the guidance along the work path 110 (see FIGS. 30, 22, 21) is represented in both drawing figures.

Figure 29:
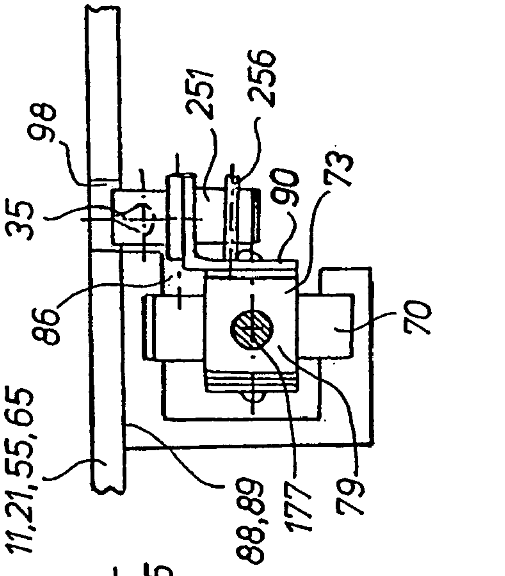
Figure 28:
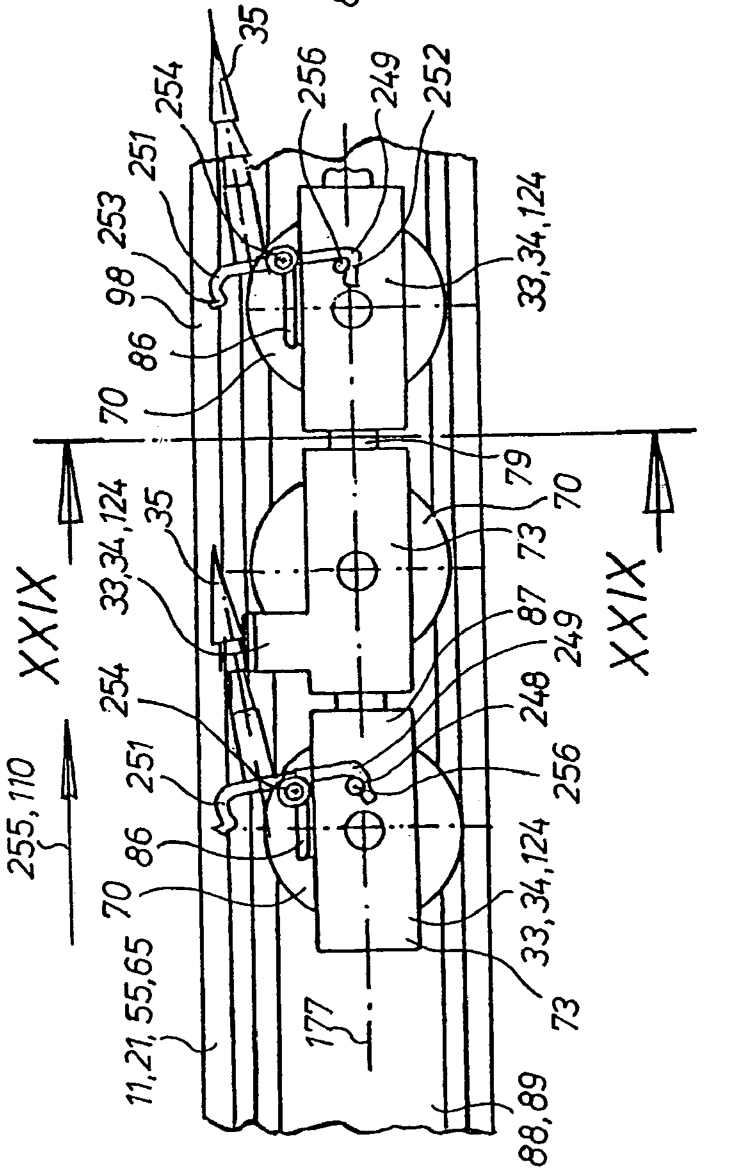

The traction means 87 moving in the draw-in direction 255 or the forward moving direction with the spikes 35 "tilted over" in the draw-in direction 255 are represented in FIGS. 28, 29. Spikes 35 are at least pivoted here so far that their pointed ends terminate inside the longitudinal slit 98, 99 of the plate 11, 21. They are moved in this position in the work path 110 by the traction means, specifically the roller chain 87.

Figure 31:
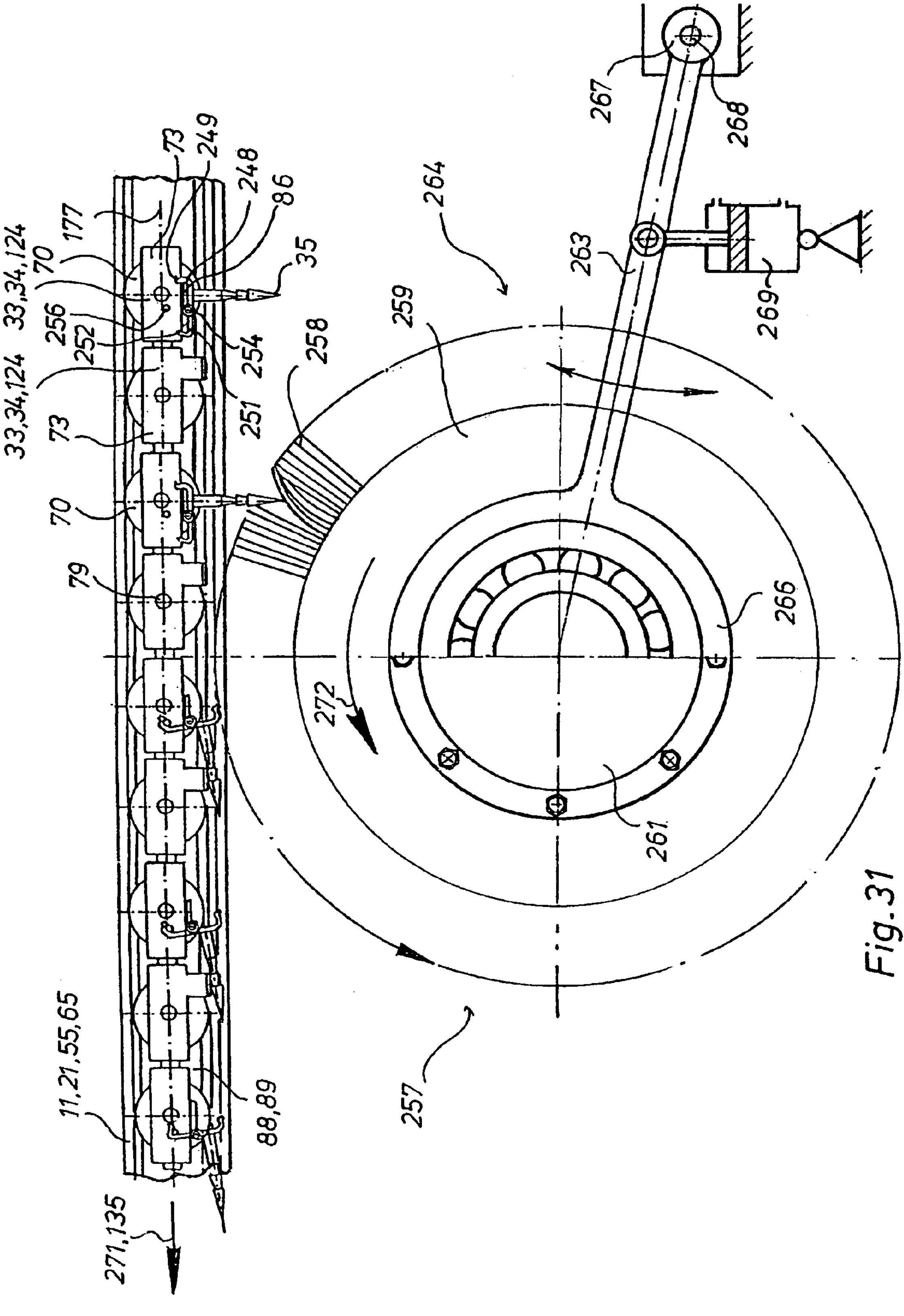
Figure 32:
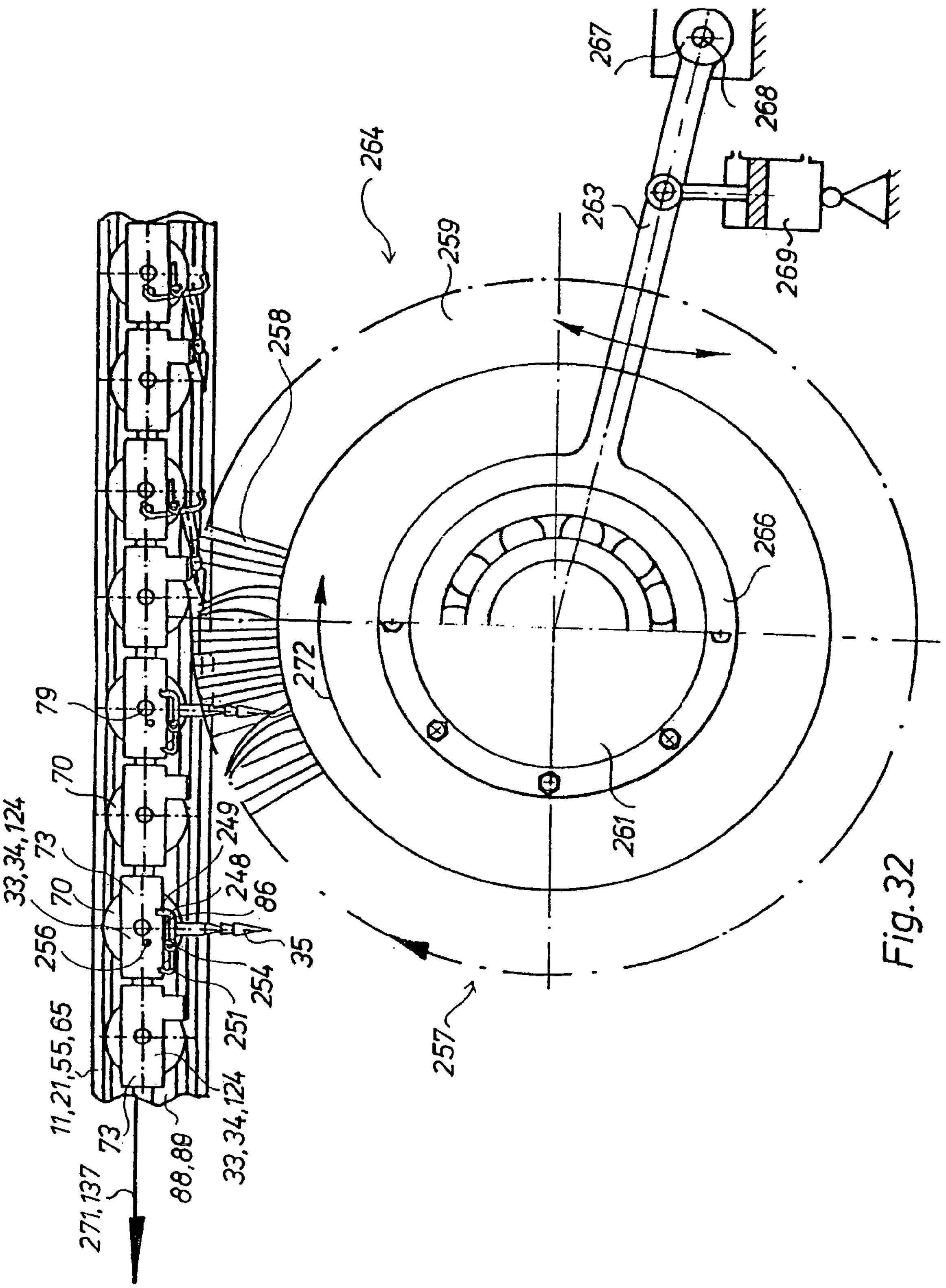
FIG. 32, the arrangement in accordance with FIG. 31, but in the “return into the upright position” working position, and in FIG. 33, a roller, which can be divided in the axial direction and placed on a passage (insertion roller or hopper folding roller).

A preferred embodiment of an arrangement 257 for pivoting and/or raising spikes 35 is represented in FIGS. 31, 32. Its action is based on the fact that it is possible to selectively exert a force in or opposite to the movement direction of the spikes 35. For this purpose, bristles and/or lamellas 258 are fastened on the outer surface of the circumference of a disk 259. The disk 259 can be driven in a clockwise or counter-clockwise direction—by means of an electric motor 261, for example—and is seated in a contact device 264. The contact device 264 is used to move the bristles, or the lamellas 258, into the movement path 135, for example the return movement path of the traction means, here the roller chain 87, or to remove it from there. The contact device 264 can, for example, be embodied as an eccentric displacement device fixed in place on the hopper, wherein the motor 261 is fixedly seated on the eccentric device, and the disk is rotatably seated in a bore of the eccentric device. In the preferred embodiment schematically represented in FIGS. 31, 32, the motor 261 and the disk 259 are seated in a bearing in a first, free end 266 of a rocker 263. A second end 267 of the rocker 263 is rotatably seated on a pin 268, which pin 268 is fixed in place on the frame or the hopper.

An actuating unit 269, which is supported on the hopper, or the frame, acts between the two ends 266, 267 of the rocker 263 and has the task to pivot the rocker 263 in such a way that the bristles, or lamellas 258, can be selectively moved into and out of the movement path, for example the return movement path 135 of the returning spikes 35. The actuating unit 269 is embodied as a two-way valve, for example.

If the movement directions 271 of the traction means 87—and therefore that of the spikes 35—and the direction of rotation 272 of the disk 259 with the bristles, or lamellas 258, proceed in the same direction (as represented in FIG. 31), the spikes are tilted over. For tilting them over, the spikes 35 which, for example, are hanging vertically, are pulled by the traction means 87 into the operating range of the rotating bristles, or lamellas 258, and arrive between them. Since the circumferential speed of the bristles, or lamellas 258, is greater than the movement speed of the spikes 35, the spikes 35 are pivoted in the movement direction 272 of the bristles, or lamellas 258, i.e. the spikes 35 tilt over. This pivoting process of the spikes 35 is stopped when the first arresting spring 252 with the first lever arm 249 comes into contact with the arresting spring 256, or extends around it, and is therefore held fast on it.

In this tilted-over position of the spikes 35 on the traction means, they are transported on along the return movement path 135 and the work path 110.

If only tilted-over spikes 35 are present in the work path 110, i.e. along the movement paths of the paper webs to be drawn in, or of the train 140, the draw-in device is stopped. For determining the position of the spikes 35 (upright or tilted over), sensors are respectively provided at the start and end of the work path 110, for example, whose signals are conducted to an appropriate electric evaluation device.

If the tilted over spikes 35 are to be raised again on their way to the work path 110, this can be performed, for example, in the manner represented in FIG. 32.

The traction means, here the roller chain 87, with the laid down, or tilted-over spikes 35, moves along the return movement path 135, for example.

The arrangement 257 for pivoting and/or raising the spikes 35 is placed in such a way that the bristles, or the lamellas 258, project into the return movement path 135 of the tilted-over spikes 35. The direction of rotation 272 of the bristles, or lamellas 258, is opposite the direction of movement 271 of the traction means 33, 34, 124, 87. The circumferential speed of the bristles, or lamellas 258, can be greater, equal to, or less—also zero—than the movement speed of the traction means with the spikes 35 to be raised in the return movement path 135.

The arrangement 257 is placed in such a way that the envelope radius of the bristles/lamellas 258 enters several millimeters (for example 5 mm) into the movement path of the outer ends of the tilted over spikes 35 (FIG. 32).

Because of the resistance which the bristles/lamellas 258 offer to the tips of the spikes 35, a force is exerted on the moving spikes 35 which is of such a size that the spikes 35 pivot around the hinge 254 and are brought into the desired raised, for example vertical, position. Now, the spikes 35 which have passed the bristles/lamellas 258, are in the "working position", as shown in FIG. 32, left portion.

If the spikes 35 are no longer to be tilted, or no longer to be raised, the arrangement 257 is turned away in such a way that no more bristles/lamellas 258 enter into the movement path 135 of the tips of the spikes 35.

The bristles/lamellas 258 can be coated with a grinding agent, for example corundum. Because of this, it is possible to sharpen the tips of the spikes 35 in a simple way in the course of "passing through" the bristles/lamellas 258. Thus, the arrangement 257 can be additionally employed as a sharpening device for the tips of the spikes 35.

To improve sliding and to make guidance of the paper webs, or of the locked-together train 140, along the inner surfaces of the guide plates 61, 62, 155, 165, 274 of the hopper guide device 273 easier, air can be blown against the inner surfaces. For this purpose, all or a portion of the guide plates 61, 62, 155, 165, 274 can be provided with a plurality of blowing nozzles, for example flat nozzles, aimed into the space between the oppositely located guide plates, for example 62–65, 61–55 (FIG. 21) and/or the hopper running plate 21. Their blowing direction is oriented, for example, in the draw-in direction of the paper web, or the train 140. The blowing nozzles have blowing openings and adjoining guide faces which are inclined obliquely downward in the direction toward the inner faces of the guide plates 61, 62, 155, 165, 274 and are bordered by a transition area in the form of an arc of a circle. The guide faces are provided with radial edges enclosing an opening angle (beta) between 20 and 50. The distance between the blowing nozzles is fixed by a division t. The ratio of this division t and the width BL of the blowing nozzle stream at a distance from the blowing opening is one to two, i.e. t/BL=1 to 2.

Blowing nozzles operating in accordance with the "hydrodynamic paradox" are preferably employed.

In place of, or in addition to the above described blowing of compressed air, a further method and device for improving the sliding and to ease the guidance of the paper webs, or of the locked-together train 140, along the inner surfaces of the guide plates 61, 62, 155, 165, 274 of the hopper guide device 273, can be provided. It consists in charging selected individual, or all guide plates 61, 62, 155, 165, 274 with mechanical oscillations, so that they vibrate. To this end, a complete hopper paper guide device 273, or individual, or several guide plates connected with each other by the same material or interlockingly, are fastened by means of oscillating elements 276 directly or indirectly, for example via insulators 148, on the lateral frame 117, 118. The oscillating elements 276 can be designed as resilient connecting elements or connecting joints, for example. Particularly suited are rubber spring elements embodied as so-called rubber-metal elements. A vibrator 277, or beater 277 is provided for creating the oscillations of the selected guide plates, or of the entire hopper guide device 273, which is/are respectively supported on the lateral frame 118, or 117, and is connected in a vibration-transmitting manner to the selected guide plates, or the entire hopper guide device 273.

Low-frequency or higher frequency vibrators (oscillation frequency of, for example, from 375 to 47000 oscillation per minute) can be employed. "Low-frequency" is understood to mean up to 1500 oscillations/minute, and "higher frequency" oscillations of more than 3000 oscillations/minute. The vibrators 227 can make adjustments of the flyweight to the desired flyweight, or oscillation range, or the frequency can be constant, but also changeable.

Electric exterior vibrators, compressed air turbo-vibrators, compressed air ball vibrators, compressed air roller vibrators, compressed air turbine vibrators, flyweight vibrators with a pneumatic and hydraulic motor drive, compressed air piston vibrators and compressed air interval beaters are suitable for use as vibrators.

Preferably the vibrator 227 is only switched on during the draw-in process.

While preferred embodiments of a roller and a device for guiding paper webs in accordance with the present invention have been set forth fully and completely hereinabove, it will be apparent to one of skill in the art that various changes in, for example, the type of printing press used, the overall width of the paper web or webs and the like could be made without departing from the true spirit and scope of the present invention which is accordingly to be limited only by the following claims.

What is claimed is:

1. A device for drawing in at least one paper web in a web-fed rotary printing press, said device comprising:

a paper web draw-in, said paper web draw-in having a length said length including a, spike bearing portion:

a plurality of spikes spaced apart from each other at a first distance and permanently attached to said, spike bearing portion of said paper web draw-in, said plurality of spikes being adapted to selectively penetrate through a paper web only during paper web draw-in along a paper web path in a web-fed rotary printing press, said paper web path being substantially greater in length than said first distance; and means moving said paper web draw-in for causing said spikes on said spike bearing portion of said length of said paper web draw-in to penetrate a paper web only during said drawing in of a paper web into a web-fed rotary printing press along said paper web path and for moving said, spike bearing portion of said paper web draw-in to a storage path for removing said spikes from penetration of a paper web upon completion of said drawing in of a paper web along said paper web path, wherein said paper draw-in is a single belt.

2. The device of claim 1 wherein said belt is metallic.

3. The device of claim 1 wherein said belt is non-metallic.

4. The device of claim 1 wherein said draw-in has a finite length.

5. The device of claim 1 further including paper web retention devices on said spikes.

6. A device for drawing in at least one paper web in a web-fed rotary printing press, said device comprising:

a paper web draw-in;

a plurality of spikes permanently attached to said paper web draw-in, said spikes being adapted to penetrate through a paper web during drawing in of a paper web along a web transport path in a web-fed rotary printing press;

a paper web retention device on each of said plurality of spikes, each said retention device being a barb; and means causing said spikes to penetrate a paper web only during said drawing in of a paper web into a web-fed rotary printing press along a web transport path and for removing said spikes from penetration of a paper web upon completion of said drawing in of a paper web along a web transport path.

* * * * *